US010720116B2

(12) United States Patent
Yokono et al.

(10) Patent No.: US 10,720,116 B2
(45) Date of Patent: Jul. 21, 2020

(54) ACTIVE MATRIX SUBSTRATE AND DISPLAY DEVICE INCLUDING THE SAME

(71) Applicant: Sharp Kabushiki Kaisha, Sakai, Osaka (JP)

(72) Inventors: Tokihiro Yokono, Sakai (JP); Takayuki Nishiyama, Sakai (JP); Ryo Yonebayashi, Sakai (JP); Kohhei Tanaka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/495,458

(22) PCT Filed: Mar. 27, 2018

(86) PCT No.: PCT/JP2018/012336
§ 371 (c)(1),
(2) Date: Sep. 19, 2019

(87) PCT Pub. No.: WO2018/181266
PCT Pub. Date: Oct. 4, 2018

(65) Prior Publication Data
US 2020/0027417 A1 Jan. 23, 2020

(30) Foreign Application Priority Data

Mar. 30, 2017 (JP) .................................. 2017-068881

(51) Int. Cl.
*G09G 3/20* (2006.01)
*G09G 3/36* (2006.01)
*G02F 1/1335* (2006.01)

(52) U.S. Cl.
CPC ..... *G09G 3/3659* (2013.01); *G02F 1/133514* (2013.01); *G09G 2320/0233* (2013.01)

(58) Field of Classification Search
CPC ......... G09G 3/3659; G09G 2320/0233; G09G 3/36; G09G 3/20; G09G 2300/0426;
(Continued)

(56) References Cited

U.S. PATENT DOCUMENTS

2012/0188297 A1* 7/2012 Numao ............. G02F 1/134309
345/690
2015/0015558 A1* 1/2015 Sasaki .................. G09G 3/3677
345/211

(Continued)

FOREIGN PATENT DOCUMENTS

WO 2014/069529 A1 5/2014
WO 2016/080500 A1 5/2016

*Primary Examiner* — Amit Chatly
(74) *Attorney, Agent, or Firm* — Keating & Bennett, LLP

(57) ABSTRACT

The invention provides a technique inhibiting luminance unevenness among pixels. An active matrix substrate has a plurality of pixel electrodes PXB each connected to a corresponding one of gate lines 13 and a corresponding one of source lines 15. The active matrix substrate includes a common electrode 14 facing each of the pixel electrodes PXB, and an auxiliary line 17 connected to the common electrode 14. The active matrix substrate further includes a plurality of drive circuits disposed in part of a display region and each configured to drive a corresponding one of the gate lines 13. The drive circuits are each connected to a control line provided for supply of a drive signal. The drive signal has first potential and second potential lower than the first potential alternately at constant cycles. The control line has a line portion 161 extending substantially in parallel with the gate lines 13. Between the line portion 161 and a capacitance forming region r where each of the pixel electrodes PXB connected to gate lines 13($n$) and 13($n$+2) switched into an unselected state during potential decrease of the line portion 161 forms capacitance between the pixel electrode PXB and the common electrode 14, the auxiliary line 17 is connected with the common electrode 14.

6 Claims, 22 Drawing Sheets

(58) Field of Classification Search
CPC ............ G09G 2310/06; G09G 2230/00; G09G 3/3655; G09G 3/3696; G02F 1/133514; G02F 1/1368; G09F 9/30
See application file for complete search history.

(56) References Cited

U.S. PATENT DOCUMENTS

| | | | |
|---|---|---|---|
| 2015/0293546 A1* | 10/2015 | Tanaka | H03K 17/04206 327/541 |
| 2015/0310792 A1* | 10/2015 | Fukushima | G09G 3/3648 345/55 |
| 2017/0090239 A1* | 3/2017 | Jung | G06F 3/0412 |
| 2017/0337887 A1* | 11/2017 | Yonebayashi | G02F 1/136286 |
| 2018/0082651 A1* | 3/2018 | Um | G09G 3/3614 |
| 2020/0064701 A1* | 2/2020 | Nishiyama | G02F 1/136286 |

\* cited by examiner

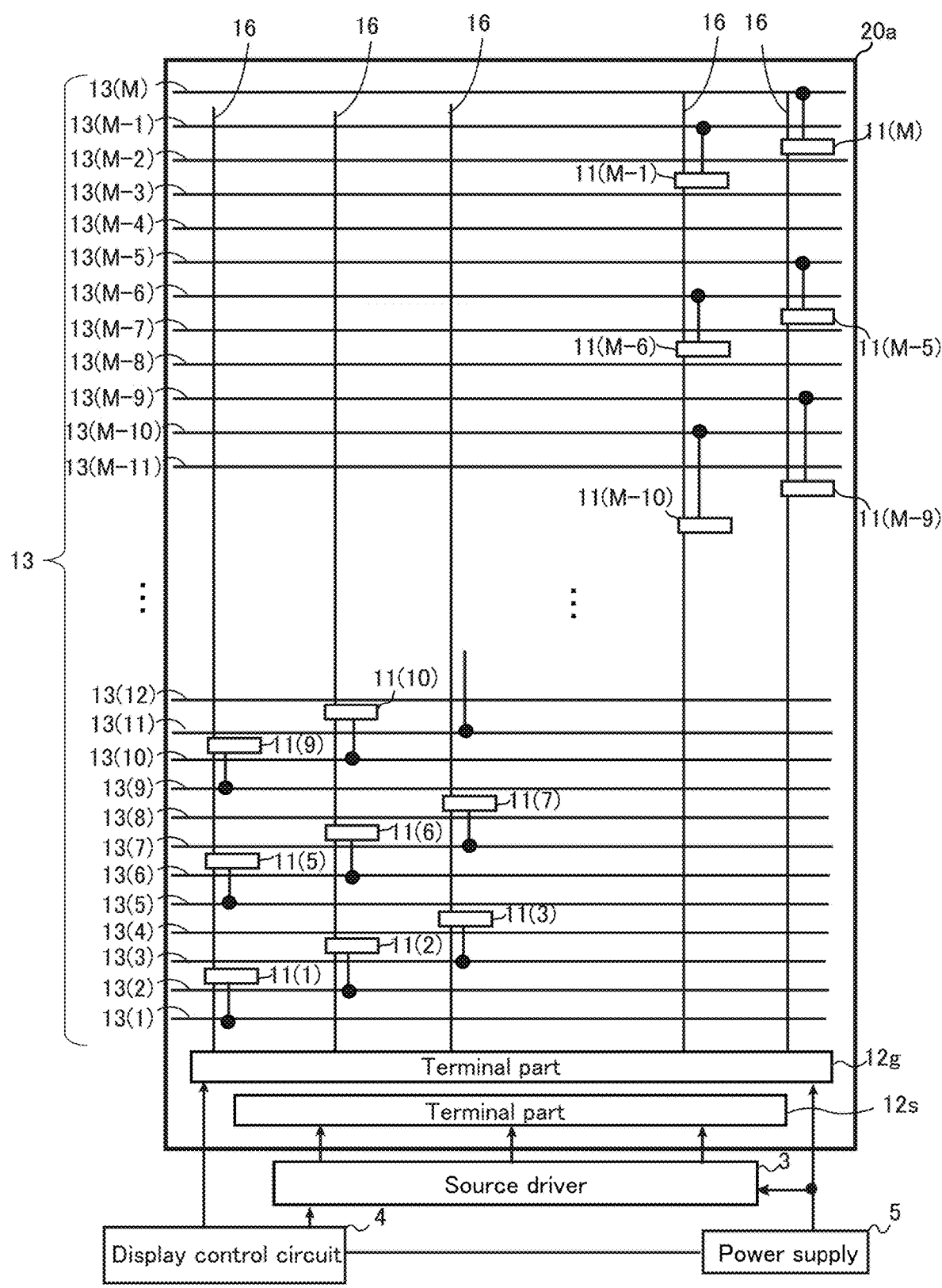
F I G. 4

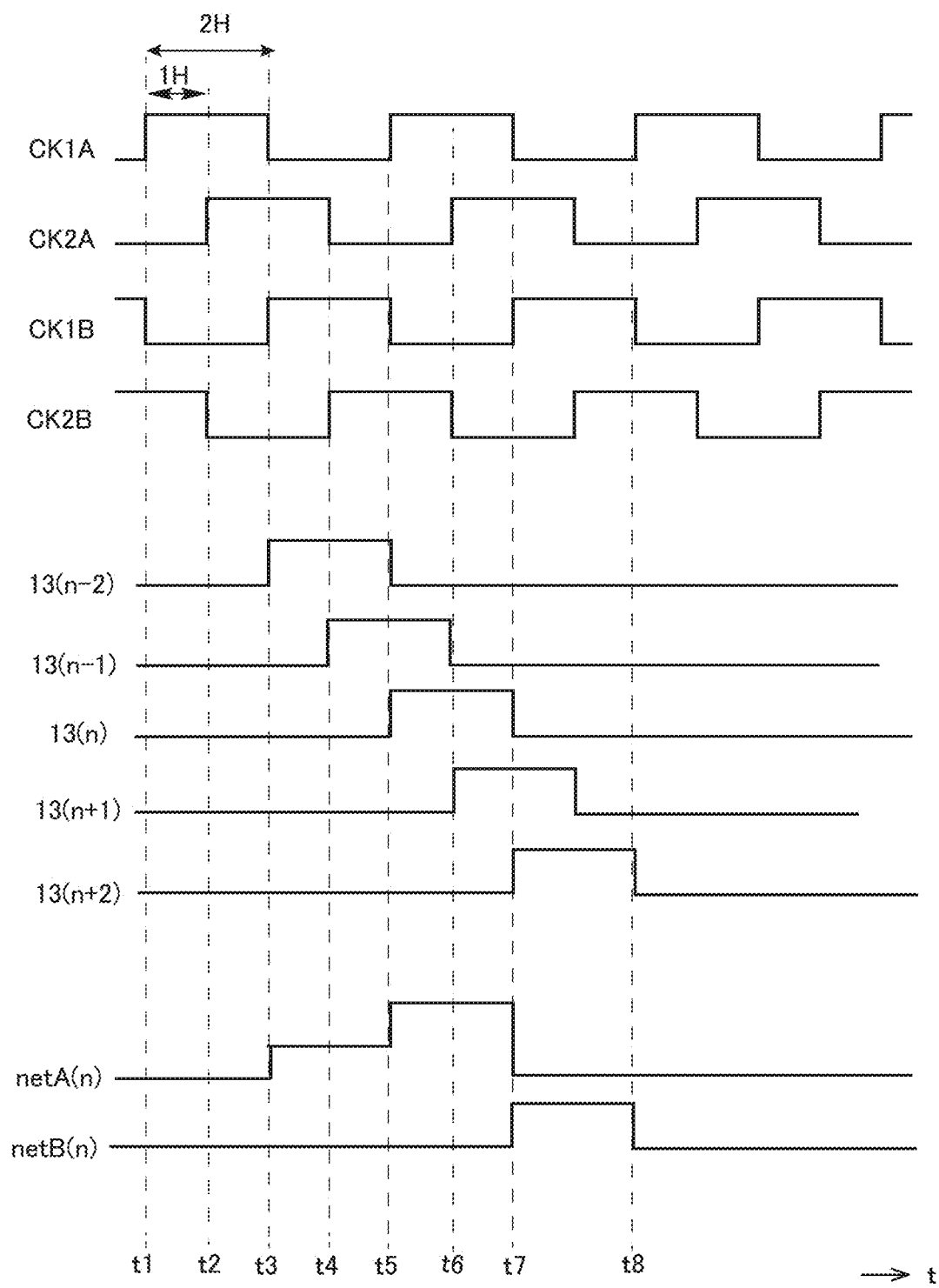
F I G. 6

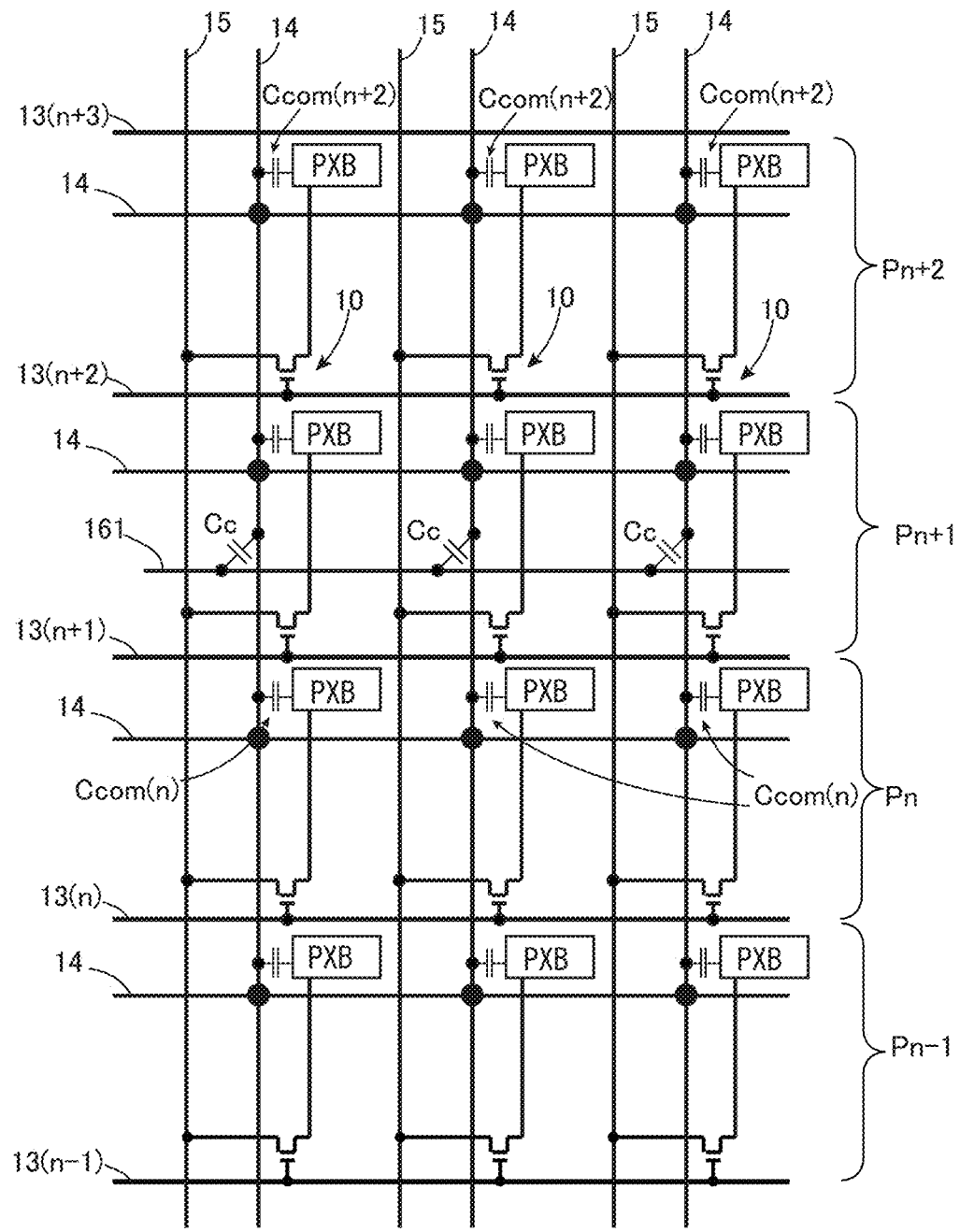
F I G. 8A

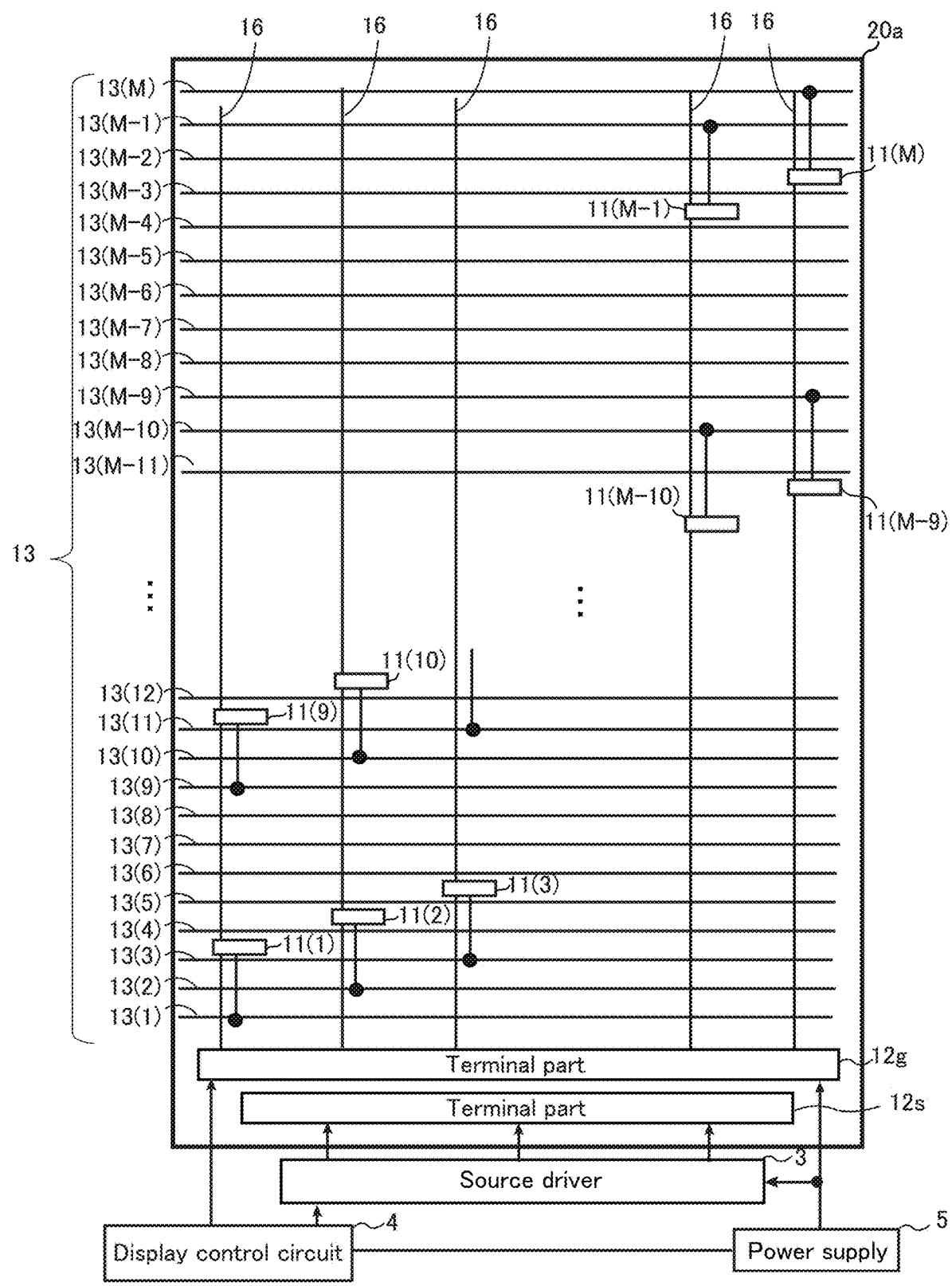
F I G. 1 4

ACTIVE MATRIX SUBSTRATE AND DISPLAY DEVICE INCLUDING THE SAME

TECHNICAL FIELD

The present invention relates to an active matrix substrate and a display device including the active matrix substrate.

BACKGROUND ART

WO 2014/069529 A discloses an active matrix substrate including drive circuits disposed in a display region and each configured to switch a corresponding one of gate lines into a selected state. Each of the drive circuits includes a plurality of switching elements and an internal line connected to part of the switching elements, and these components are dispersed in a plurality of pixels adjacent to the corresponding one of the gate lines. The active matrix substrate is further provided with a control line for supply of a control signal to each of the drive circuits. The internal line in the drive circuit has potential varied in accordance with the supplied control signal, and the gate line receives a voltage signal that causes the gate line to come into the selected state or an unselected state.

DISCLOSURE OF INVENTION

According to WO 2014/069529 A, the control line provided adjacent to the gate line has potential that may decrease at timing when the gate line is switched into the unselected state. Such potential variation of the line influences a common electrode that is disposed to face a pixel electrode provided in each pixel. When the potential variation of the control line propagates via the common electrode to the pixel electrodes connected to the gate line that is switched into the unselected state at timing when potential of the line varies, the pixels including the pixel electrodes have potential decrease to cause luminance unevenness.

It is an object of the present invention to provide a technique decreasing luminance unevenness among pixels.

The present invention provides an active matrix substrate including a plurality of gate lines, a plurality of source lines, a plurality of pixel electrodes respectively provided in a plurality of pixels defined by the plurality of gate lines and the plurality of source lines, and a common electrode disposed to face each of the pixel electrodes, the active matrix substrate further including: a plurality of drive circuits respectively provided for the plurality of gate lines, each configured to switch a corresponding one of the gate lines into a selected state or an unselected state in accordance with a received drive signal, and disposed in part of a display region including the plurality of pixels; a control line for supply of the drive signal to each of the drive circuits; and an auxiliary line provided in the display region and connected to the common electrode; in which the drive signal has potential switched between first potential and second potential lower than the first potential at constant cycles, the control line includes a line portion substantially in parallel with the gate lines, part of the gate lines are switched into the unselected state while the line portion is changed in potential to the second potential, and between the line portion and a capacitance forming region where each of the pixel electrodes connected to the part of the gate lines forms capacitance between the pixel electrode and the common electrode, the auxiliary line is connected with the common electrode.

The present invention provides a configuration inhibiting luminance unevenness among pixels.

BRIEF DESCRIPTION OF DRAWINGS

FIG. 4 is a pattern diagram showing schematic configurations of the active matrix substrate in FIG. 1 and parts connected to the active matrix substrate.

FIG. 6 is a timing chart indicating potential change of clock signals and gate lines according to a first embodiment.

FIG. 8A is an explanatory pattern diagram on influence of potential variation of a partial line in a case where no auxiliary line is provided.

FIG. 14 is a pattern diagram showing exemplary disposition of gate drivers according to a modification example 1.

DESCRIPTION OF EMBODIMENTS

Figure 1:
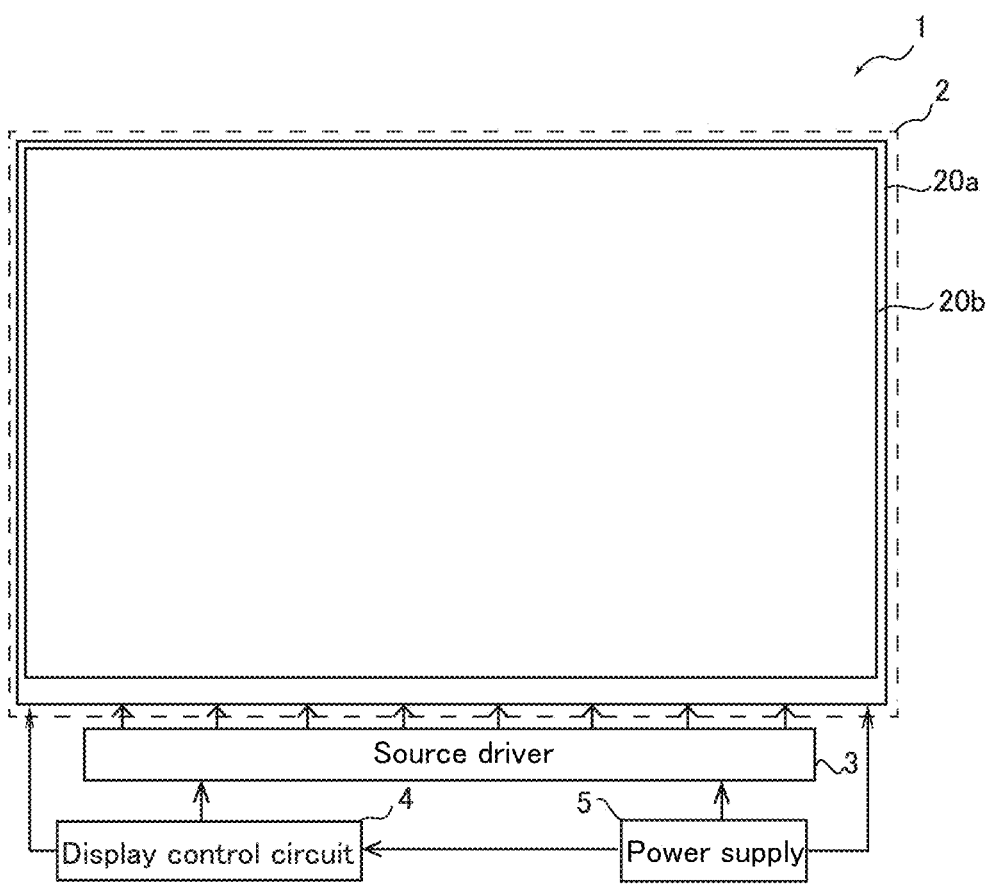
FIG. 1 is a pattern diagram showing a schematic configuration of a liquid crystal display device according to an embodiment.

An active matrix substrate according to an embodiment of the present invention includes a plurality of gate lines, a plurality of source lines, a plurality of pixel electrodes respectively provided in a plurality of pixels defined by the plurality of gate lines and the plurality of source lines, and a common electrode disposed to face each of the pixel electrodes. The active matrix substrate further includes: a plurality of drive circuits respectively provided for the plurality of gate lines, each configured to switch a corresponding one of the gate lines into a selected state or an unselected state in accordance with a received drive signal, and disposed in part of a display region including the plurality of pixels; a control line for supply of the drive signal to each of the drive circuits; and an auxiliary line provided in the display region and connected to the common electrode; in which the drive signal has potential switched between first potential and second potential lower than the first potential at constant cycles, the control line includes a line portion substantially in parallel with the gate lines, part of the gate lines are switched into the unselected state while the line portion is changed in potential to the second potential, and between the line portion and a capacitance forming region where each of the pixel electrodes connected to the part of the gate lines forms capacitance between the pixel electrode and the common electrode, the auxiliary line is connected with the common electrode (a first configuration).

According to the first configuration, the common electrode and the auxiliary line are connected to each other between the line portion of the control line and the capacitance forming region where each of the pixel electrodes connected to the gate line, which is switched into the unselected state during potential decrease of the line portion, forms capacitance between the pixel electrode and the common electrode. This configuration leads to reduction in resistance of the common electrode to be less likely to propagate, to the capacitance forming region via the common electrode, noise generated by potential variation of the line portion. This decreases capacitance variation in the capacitance forming region to be less likely to cause luminance unevenness.

Optionally, the active matrix substrate according to the first configuration further includes: an insulating film interposed between the auxiliary line and the common electrode; in which the insulating film has a contact hole between the capacitance forming region and the line portion, at a position where the auxiliary line and the common electrode are overlapped with each other, and the auxiliary line is connected with the common electrode via the contact hole (a second configuration).

The second configuration provides connection between the auxiliary line and the common electrode via the contact hole provided in the insulating film, for reduction in resistance of the common electrode.

In the first configuration, between the capacitance forming region and the line portion, the auxiliary line may be in contact with the common electrode (a third configuration).

The third configuration enables connection between the auxiliary line and the common electrode via no contact hole and reduction in resistance of the common electrode.

In any one of the first to third configurations, optionally, the plurality of pixel is arrayed to form a matrix, and the line portion is provided in a row other than a row of the pixels including the pixel electrodes connected to the gate line that is switched into the unselected state while the line portion changes in potential from the first potential to the second potential (a fourth configuration).

In comparison to a case where the line portion is provided in the row of the pixels including the pixel electrodes connected to the gate line that is switched into the unselected state while the potential of the line portion changes to the second potential, the fourth configuration decreases influence of noise generated by potential variation of the line portion on the capacitance forming regions in the row of the pixels.

A display device according to a different embodiment of the present invention includes: the active matrix substrate according to any one of first to fourth configurations; a counter substrate having a color filter; and a liquid crystal layer interposed between the active matrix substrate and the counter substrate (a fifth configuration).

According to the fifth configuration, the common electrode and the auxiliary line are connected to each other between the line portion and the capacitance forming region where each of the pixel electrodes connected to the gate line, which is switched into the unselected state during potential decrease of the line portion, forms capacitance between the pixel electrode and the common electrode. This configuration leads to reduction in resistance of the common electrode to be less likely to propagate, to the capacitance forming region via the common electrode, noise generated by potential variation of the line portion. This inhibits capacitance variation in the capacitance forming region to be less likely to cause luminance unevenness.

In the fifth configuration, optionally, the pixels each have two domain regions different from each other in orientation of liquid crystal molecules, and the line portion is disposed at a boundary between the two domain regions in the pixel provided with the line portion (a seventh configuration).

According to the seventh configuration, the domain regions, which have decrease in transmissivity around the boundary to cause a dark line, are provided at the boundary with the line portion for inhibition of decrease in transmissivity of the pixel.

Embodiments of the present invention will now be described in detail below with reference to the drawings. Identical or corresponding parts in the drawings will be denoted by identical reference signs and will not be described repeatedly.

(Configuration of Liquid Crystal Display Device)

FIG. 1 is a pattern diagram showing a schematic configuration of a liquid crystal display device according to the present embodiment. A liquid crystal display device 1 includes a display panel 2, a source driver 3, a display control circuit 4, and a power supply 5. The display panel 2 includes an active matrix substrate 20a, a counter substrate 20b, and a liquid crystal layer (not shown) interposed between these substrates. Though not shown in FIG. 1, the active matrix substrate 20a and the counter substrate 20b are interposed between a pair of polarizing plates. The counter substrate 20b is provided with a black matrix (BM) and color filters for three colors of red (R), green (G), and blue (B) (none shown).

As shown in FIG. 1, the active matrix substrate 20a is electrically connected to the source driver 3 provided on a flexible substrate. The display control circuit 4 is electrically connected to the display panel 2, the source driver 3, and the power supply 5. The display control circuit 4 outputs a control signal to each of the source driver 3 and drive circuits to be described later (hereinafter, referred to as gate drivers) provided on the active matrix substrate 20a. The power supply 5 is electrically connected to the display panel 2, the source driver 3, and the display control circuit 4, and supplies each of these parts with a power supply voltage signal.

(Configuration of Active Matrix Substrate)

Figure 2:
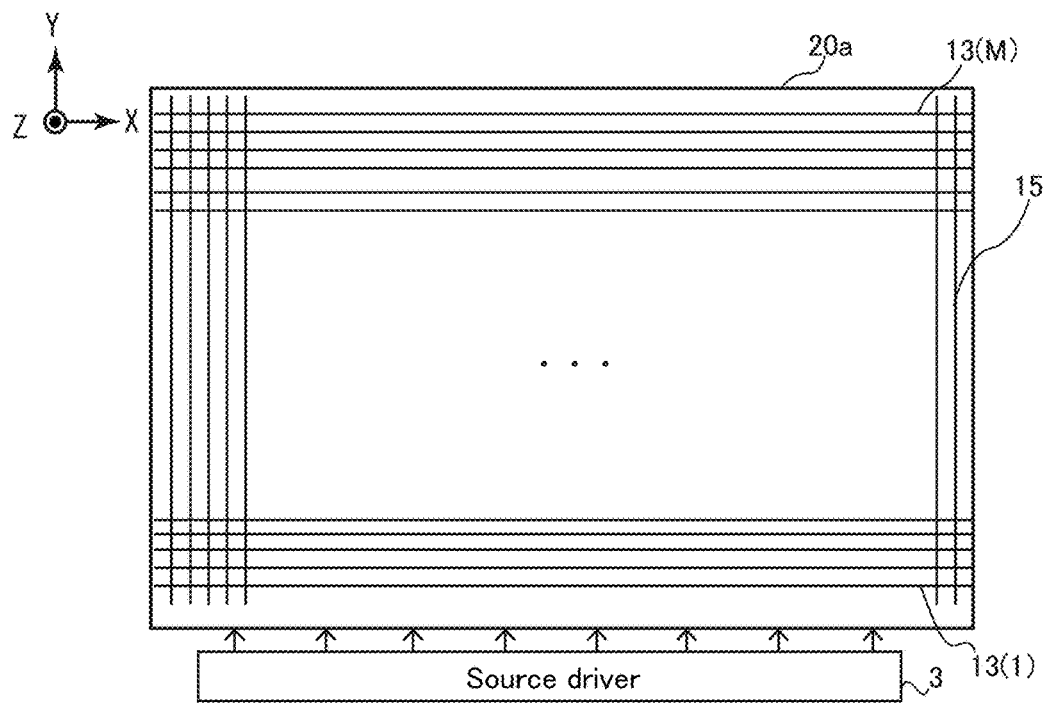
FIG. 2 is a pattern diagram showing a schematic configuration of an active matrix substrate shown in FIG. 1.

FIG. 2 is a pattern diagram showing a schematic configuration of the active matrix substrate 20a. The active matrix substrate 20a has an M (M is a natural number) gate lines 13(1) to 13(M) extending from a first end to a second end in an X-axis direction and aligned substantially in parallel with one another at constant intervals. The gate lines will be each called a gate line 13 when not distinguished from one another. The active matrix substrate 20a is provided with a plurality of source lines 15 crossing the gate lines 13. Each regions defined by gate lines 13 and source lines 15 functions as a pixel. Pixels PIX each correspond to one of the colors of the color filters and are arrayed in the order of R, G, and B along the extending gate lines 13.

Figure 3:
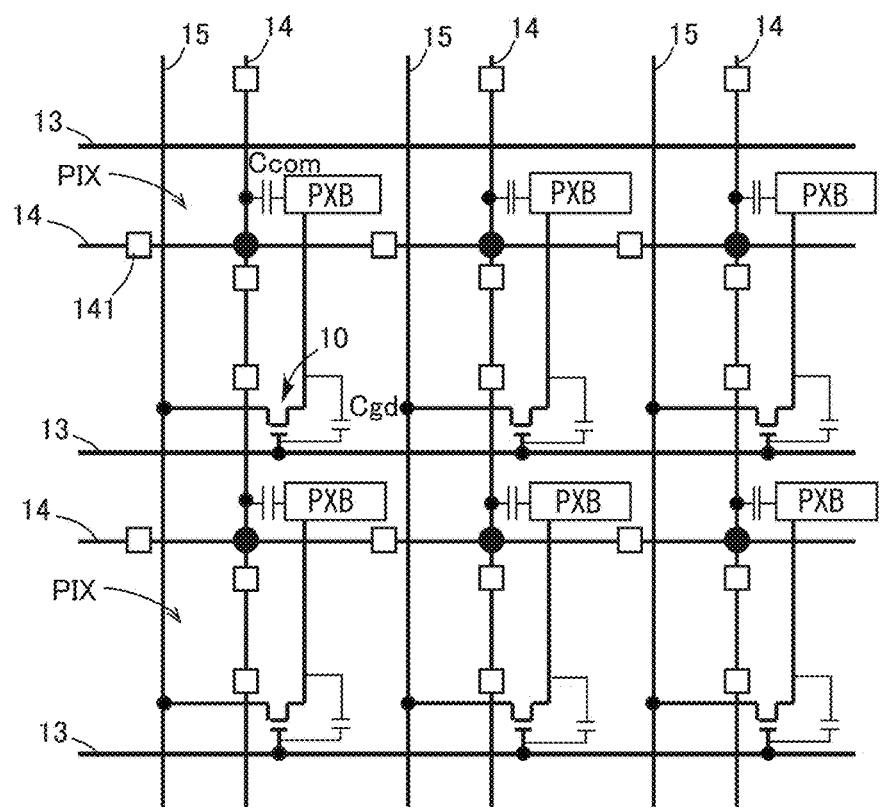
FIG. 3 is a pattern diagram showing a schematic configuration of pixels shown in FIG. 2.

FIG. 3 is a pattern diagram showing a schematic configuration of part of the pixels on the active matrix substrate 20a. As shown in FIG. 3, the pixels PIX each include a thin film transistor 10 (TFT) (hereinafter, referred to as a pixel TFT) connected to a corresponding one of the gate lines 13 and a corresponding one of the source lines 15, and a pixel electrode PXB connected to a drain electrode of the pixel TFT 10. Examples of the display panel 2 according to the present embodiment include a liquid crystal panel in a fringe field switching (FFS) mode. The pixel electrode PXB is constituted by a transparent conductive film made of ITO or the like, and has a plurality of slits. The pixels are each constituted by a single domain having identical orientation of liquid crystal molecules.

The active matrix substrate 20a is further provided with common electrodes 14 each constituted by a transparent conductive film made of ITO or the like and facing the pixel electrodes PXB via an insulating film. The common electrodes 14 provided at the pixels are connected via resistors 141. When the pixel TFT 10 is switched ON, the source driver 3 (see FIG. 2) transmits data signal voltage to the pixel electrode PXB via the source line 15. The display control circuit 4 (see FIG. 1) applies predetermined voltage to each of the common electrodes 14. The pixels PIX each have potential controlled by potential of the source line 15, capacitance Cgd between the pixel electrode PXB and the gate line 13, and pixel capacitance Ccom between the pixel electrode PXB and the common electrode 14, in accordance with potential change of the gate line 13.

FIG. 4 is a pattern diagram showing schematic configurations of the active matrix substrate 20a and parts connected to the active matrix substrate 20a. FIG. 4 excludes the source lines 15 for clearer depiction. As exemplified in FIG. 4, each of the gate lines 13 is provided with a gate driver 11. The gate drivers 11 are each disposed between the gate line 13 in the first row and the gate line 13 in the second row from the corresponding gate line 13. Each of the gate drivers 11 is connected, via a control line 16, to the gate driver 11 configured to drive the fifth gate line 13 from the gate line 13 driven by the corresponding gate driver 11.

The active matrix substrate 20a shown in FIG. 4 has a frame region including a side provided with the source driver 3 and terminal parts 12g and 12s. The terminal part 12g is connected to the display control circuit 4 and the power supply 5. The terminal part 12s is connected to the display control circuit 4, the source driver 3, and the source lines 15 (see FIG. 2).

The display control circuit 4 supplies the terminal part 12g with, as control signals, a signal (hereinafter, called a clock signal) having potential repetitively reaching an H level (VDD) and an L level (VSS) in every two horizontal periods, and a signal (hereinafter, called a reset signal) having potential reaching the H level for a constant period in every vertical period. These control signals will be described in detail later.

The power supply 5 supplies each of the source driver 3 and the terminal part 12g with a power supply voltage signal.

The terminal part 12g receives signals including the control signals and the power supply voltage signal thus supplied, and supplies each of the gate drivers 11 with the signals via the control line 16. Each of the gate drivers 11 outputs, to the corresponding gate line 13, a voltage signal indicating one of a selected state and an unselected state, in accordance with the supplied signals. The state where the gate line 13 is selected will hereinafter be described that the gate line 13 is driven. The source driver 3 outputs a data signal to each of the source lines 15 (see FIG. 2) via the terminal part 12s in accordance with the signal received from the display control circuit 4.

Figure 5:
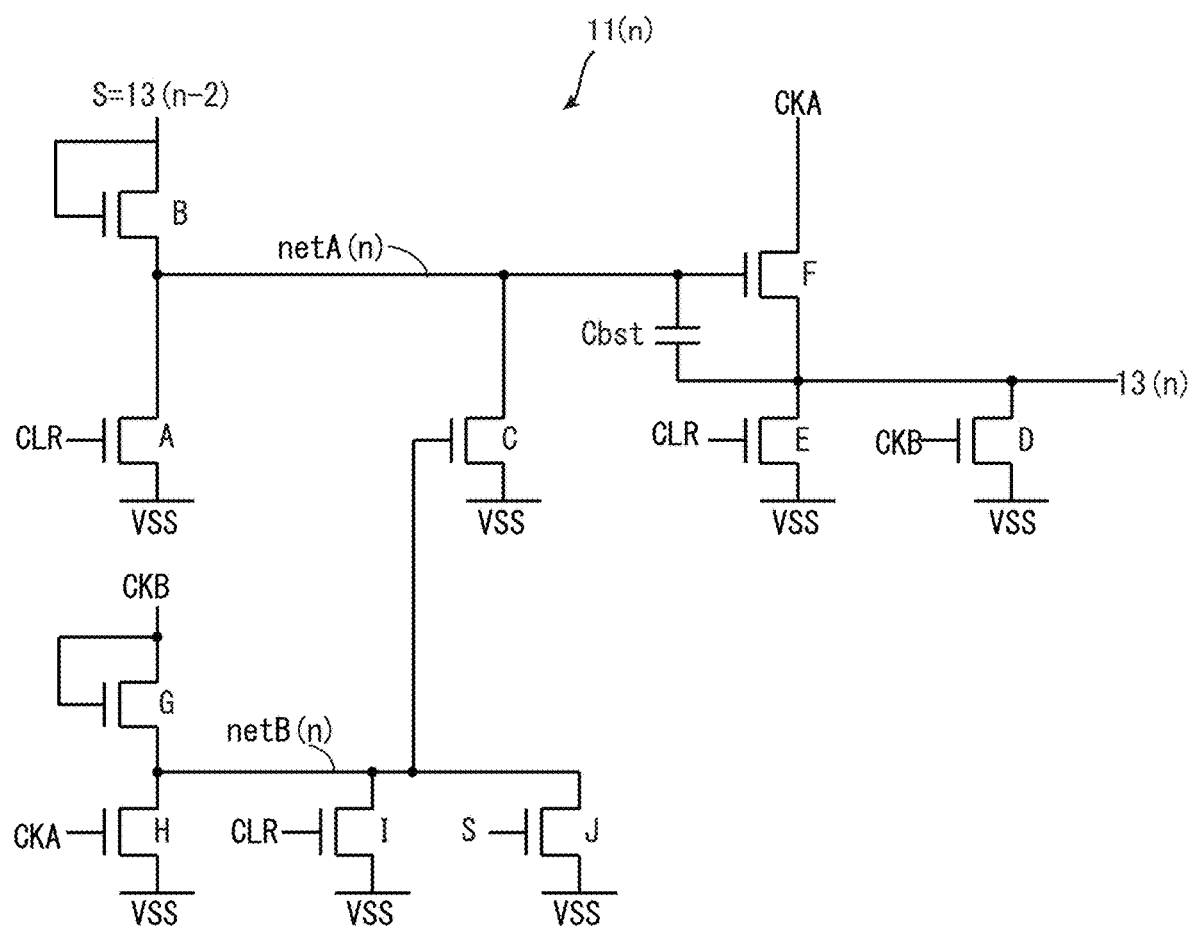
FIG. 5 is a diagram of an exemplary equivalent circuit of a gate driver shown in FIG. 4.

The gate drivers 11 will be described next in terms of their configuration. FIG. 5 is a diagram exemplarily showing an equivalent circuit of a gate driver 11(n) connected to the gate line 13(n). In this case, n=4j+1 is established and j is an integer equal to or more than zero.

The gate driver 11(n) includes thin film transistors (TFTs) indicated by alphabets A to J (hereinafter, called a TFT-A to a TFT-J) and functioning as switching elements, and a capacitor Cbst.

FIG. 5 shows an internal line netA connected to a source terminal of the TFT-B, drain terminals of the TFT-A and the TFT-C, a gate terminal of the TFT-F, and a first electrode of the capacitor Cbst. FIG. 5 also shows an internal line netB connected to a source terminal of the TFT-G, drain terminals of the TFT-H, the TFT-I, and the TFT-J, and a gate terminal of the TFT-C.

The TFT-A has the drain terminal connected to the netA, a gate terminal supplied with a reset signal CLR, and a source terminal supplied with a power supply voltage signal VSS. The TFT-A decreases potential of a netA(n) to the L level (VSS) in accordance with potential of the reset signal CLR.

The TFT-B has a gate terminal connected to the gate line 13(n−2), and the source terminal connected to the netA(n) in the gate driver 11(n). The TFT-B receives, as a set signal S, potential of the gate line 13(n−2). The TFT-B outputs potential of the set signal S to the netA(n) in accordance with potential of the gate line 13(n−4) to precharge the netA(n). The TFT-B in the gate driver 11 configured to drive the gate line 13(1) receives a gate start pulse signal as the set signal S from the display control circuit 4.

The TFT-C has the gate terminal connected to a netB(n), the drain terminal connected to the netA(n), and a source terminal supplied with the power supply voltage signal VSS. The TFT-C changes the potential of the netA(n) to the L level (VSS) in accordance with potential of the netB(n).

The TFT-F has the gate terminal connected to the netA(n), a source terminal connected to the gate line 13(n), and a drain terminal supplied with a clock signal CKA. The TFT-F outputs potential of the clock signal CKA to the gate line 13(n) in accordance with the potential of the netA(n) to charge the capacitor Cbst and switch the gate line 13(n) into the selected state.

The capacitor Cbst includes the first electrode connected to the netA(n) and a second electrode connected to the gate line 13(n). The capacitor Cbst increases the potential of the netA(n) in accordance with the potential of the clock signal CKA outputted from the TFT-F.

The TFT-E has a drain terminal connected to the gate line 13(n), a gate terminal supplied with the reset signal CLR, and a source terminal supplied with the power supply voltage signal VSS. The TFT-E changes potential of the gate line 13(n) to the L level (VSS) in accordance with the potential of the reset signal CLR.

The TFT-D has a drain terminal connected to the gate line 13(n), a gate terminal supplied with a clock signal CKB, and a source terminal supplied with the power supply voltage signal VSS. The TFT-D changes the potential of the gate line 13(n) to the L level (VSS) in accordance with potential of the clock signal CKB.

The TFT-G has a gate terminal and a drain terminal connected to each other and each supplied with the clock signal CKB, and the source terminal connected to the netB(n). The TFT-G outputs, to the netB(n), potential (obtained by potential at the H level of the clock signal CKB—threshold voltage) in accordance with the potential of the clock signal CKB.

The TFT-H has the drain terminal connected to the netB(n), a gate terminal supplied with the clock signal CKA, and a source terminal supplied with the power supply voltage signal VSS. The TFT-H changes the potential of the netB(n) to the L level (VSS) in accordance with the potential of the clock signal CKA.

The TFT-I has the drain terminal connected to the netB(n), a gate terminal supplied with the reset signal CLR, and a source terminal supplied with the power supply voltage signal VSS. The TFT-I changes the potential of the netB(n) to the L level (VSS) in accordance with the potential of the reset signal CLR.

The TFT-J has the drain terminal connected to the netB(n), a gate terminal connected to the gate line 13(n−2), and a source terminal supplied with the power supply voltage signal VSS. The TFT-J receives, as the set signal S, the potential of the gate line 13(n−2). The TFT-J in the drive circuit 11 configured to drive the gate line 13(1) receives a gate start pulse signal as the set signal S from the display control circuit 4. The TFT-J changes the potential of the netB(n) to the L level (VSS) in accordance with the potential of the set signal S.

FIG. 6 is a timing chart indicating potential change of clock signals, the gate lines 13(n−2) to 13(n+2), the netA(n), and the netB(n) according to the present practical example.

Four clock signals CK1A, CK2A, CK1B, and CK2B have phases shifted by ½ cycles each, and each have potential alternately reaching the H level (VDD) and the L level (VSS) in every two horizontal scanning periods (2H). Although not indicated in FIG. 6, the reset signal CLR reaches the H level for a constant period in every vertical scanning period, and is outputted from the display control circuit 4 in each frame.

The clock signals CKA and CKB supplied to the TFT-F and the TFT-H, and the TFT-D and the TFT-G, respectively, in the gate driver 11 (see FIG. 5) correspond to two clock signals having phases opposite to each other in the four clock signals. There are four combinations of the clock signals CKA and CKB, namely, (CK1A, CK1B), (CK2A, CK2B), (CK1B, CK1A), and (CK2B, CK2A).

Each of the gate drivers 11 is supplied with the clock signals having phases shifted by ½ cycles from the clock signals supplied to the gate driver 11 configured to drive the gate line 13 in the preceding row. In a case where the gate driver 11(n) is supplied with the combination (CK1A, CK1B) as the clock signals CKA and CKB, the gate driver 11(n+1) is supplied with the combination (CK2A, CK2B) as the clock signals CKA and CKB and the gate driver 11(n−1) is supplied with the combination (CK2B, CK2A) as the clock signals CKA and CKB.

The gate driver 11(n) will be described in terms of its operation with reference to FIGS. 5 and 6. The following description assumes that the gate driver 11(n) is supplied with the clock signal CK1A as the clock signal CKA, and the clock signal CK1B as the clock signal CKB.

At time t3 in FIG. 6, the TFT-B and the TFT-J each receive the potential at the H level of the gate line 13(n−2) to be switched ON. When the TFT-B is switched ON, potential (VDD−Vth(B)) less than the potential at the H level by threshold voltage (Vth(B)) is precharged to the netA(n).

In this case, the drain terminal of the TFT-F is supplied with the clock signal CK1A having potential at the L level and the gate terminals of the TFT-D and the TFT-G are each supplied with the clock signal CK1B having potential at the H level. This causes the TFT-D, the TFT-G, and the TFT-F to be switched ON, and the netB(n) and the gate line 13(n) each have potential kept at the L level (VSS).

From the time t3 to time t5, the clock signal CK1A has potential kept at the L level and the clock signal CK1B has potential kept at the H level. Accordingly, from the time t3 to the time t5, the netA(n) is kept in a precharged state and the gate line 13(n) is kept in the unselected state. The gate line 13(n−2) is kept in the selected state from the time t3 to the time t5, and has potential reaching the L level to be switched into the unselected state at the time t5. Accordingly, the TFT-B and the TFT-J are in an ON state from the time t3 to the time t5 and are in an OFF state from the time t5.

At the time t5, the potential of the clock signal CK1A changes to the H level and the capacitor Cbst increases the potential of the netA(n) to a level higher than the H level. In this case, the potential of the clock signal CK1B is at the L level and the TFT-D and the TFT-G are switched OFF. The gate line 13(n) is thus changed in potential from the L level to the H level and is switched into the selected state.

From the time t5 to time t7, the clock signal CK1A has potential kept at the H level and the clock signal CK1B has potential kept at the L level. The gate line 13(n) is thus kept in the selected state from the time t5 to the time t7.

At the time t7, the potential of the clock signal CK1A changes from the H level to the L level and the potential of the clock signal CK1B changes from the L level to the H level. This causes the TFT-D and the TFT-G to be switched ON and causes the TFT-H to be switched OFF. Accordingly, the gate line 13(n) receives potential at the L level (VSS) and is switched into the unselected state. The netB(n) receives potential at the H level via the TFT-G, and the TFT-C is switched ON. The netA(n) accordingly receives potential at the L level (VSS) via the TFT-C and has potential kept at the L level from the time t7.

From the time t5 to the time t7, the display control circuit 4 supplies each of the source lines 15, via the terminal part 12s, with a data signal to be written to each of the pixels including the pixel TFT 10 connected to the gate line 13(n). From the time t7 when the gate line 13(n) comes into the unselected state during a single frame period, the pixel electrode PXB in the pixel keeps voltage according to the data signal received via the pixel TFT 10.

As shown in FIG. 5, the gate line 13(n) is switched into the unselected state at timing (t7) when the potential of the clock signal CK1A changes from the H level to the L level, and the gate line 13(n+2) is switched into the unselected state at timing (t8) when the potential of the clock signal CK1B changes from the H level to the L level. The gate line 13(n+2) is switched into the selected state at timing (t7) when the potential of the clock signal CK1A changes from the L level to the H level.

Figure 7A:
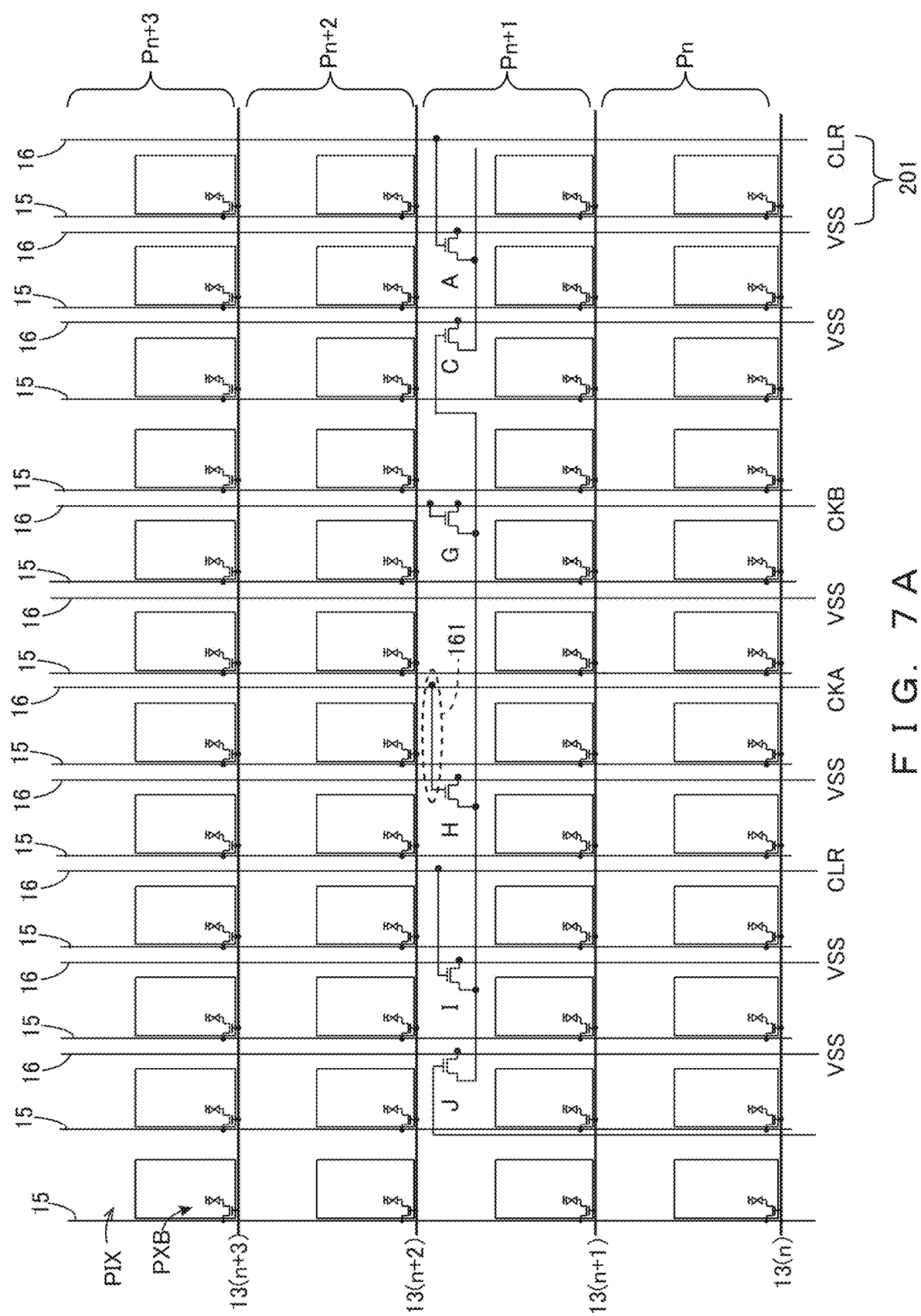
FIG. 7A is a pattern diagram showing exemplary disposition of elements included in the gate driver in FIG. 6.
Figure 7B:
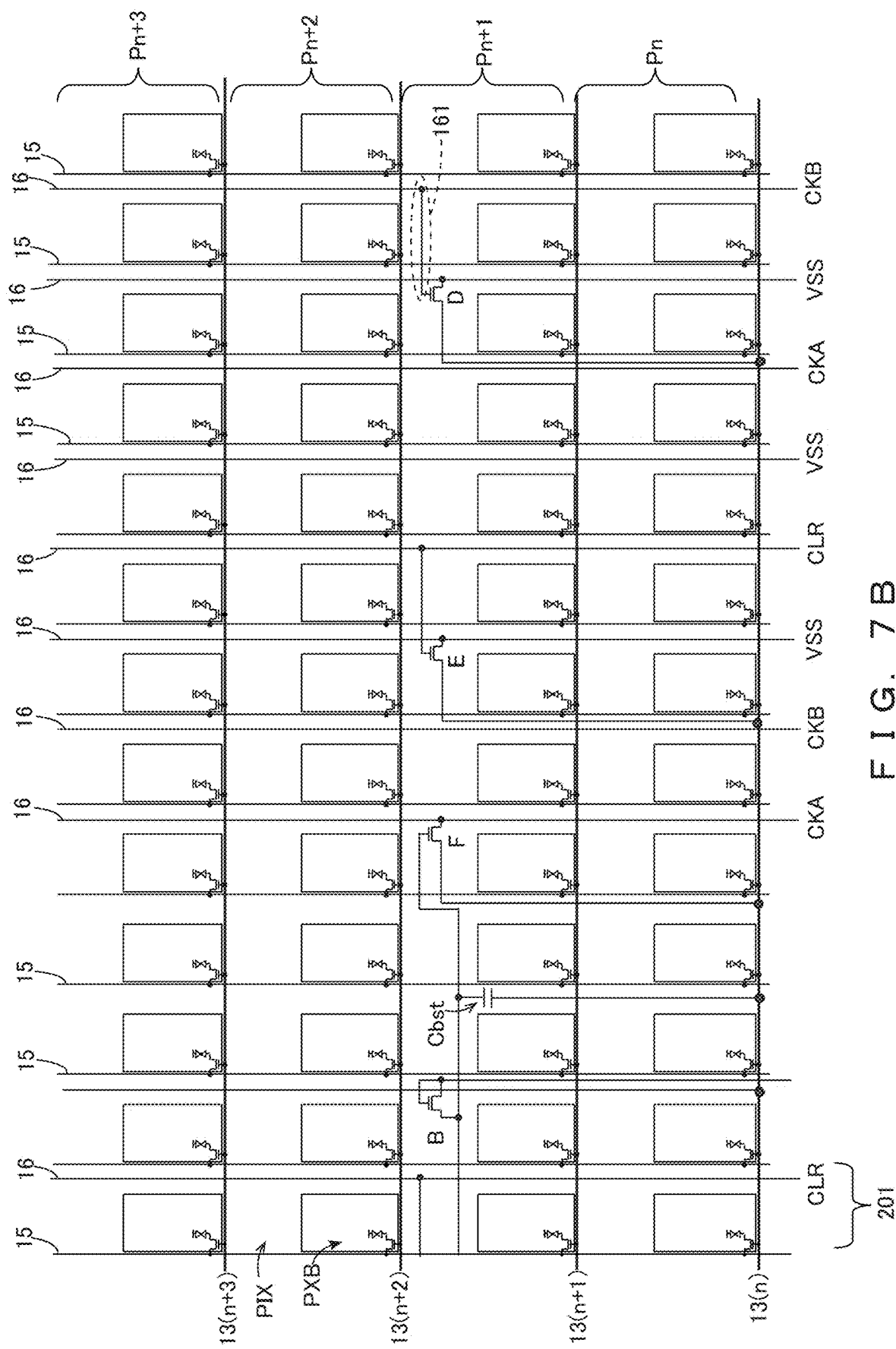
FIG. 7B is a pattern diagram showing different exemplary disposition of the elements included in the gate driver in FIG. 6.

FIGS. 7A and 7B are pattern diagrams each showing exemplary disposition of elements included in the gate driver 11(n) according to the present embodiment. FIGS. 7A and 7B are assumed to be continuous from each other at a column 201.

The elements constituting the gate driver 11(n) are dispersed in the pixels disposed between the gate line 13(n+1) and the gate line 13(n+2), in other words, in a row Pn+1 of the pixels including the pixel electrodes PXB connected to the gate line 13(n+1). The elements constituting the gate driver 11 are disposed in light shielding regions covered with a black matrix (not shown) provided on the counter substrate 20b (see FIG. 1). The control line 16 for supply of control signals such as clock signals to the gate driver 11(n) extends along the source lines 15 to reach the row Pn+1, and is substantially in parallel with the gate lines 13 to the pixel including the TFT configured to supply a control signal.

As shown in FIG. 6, the gate line 13(n) according to this example is switched into the unselected state at timing when the potential of the clock signal CK1A changes from the H level to the L level. The gate line 13(n+2) is switched into the selected state at timing when the potential of the clock signal CK1A changes from the L level to the H level, and is switched into the unselected state at timing when the potential of the clock signal CK1B changes from the H level to the L level.

Figure 8B:
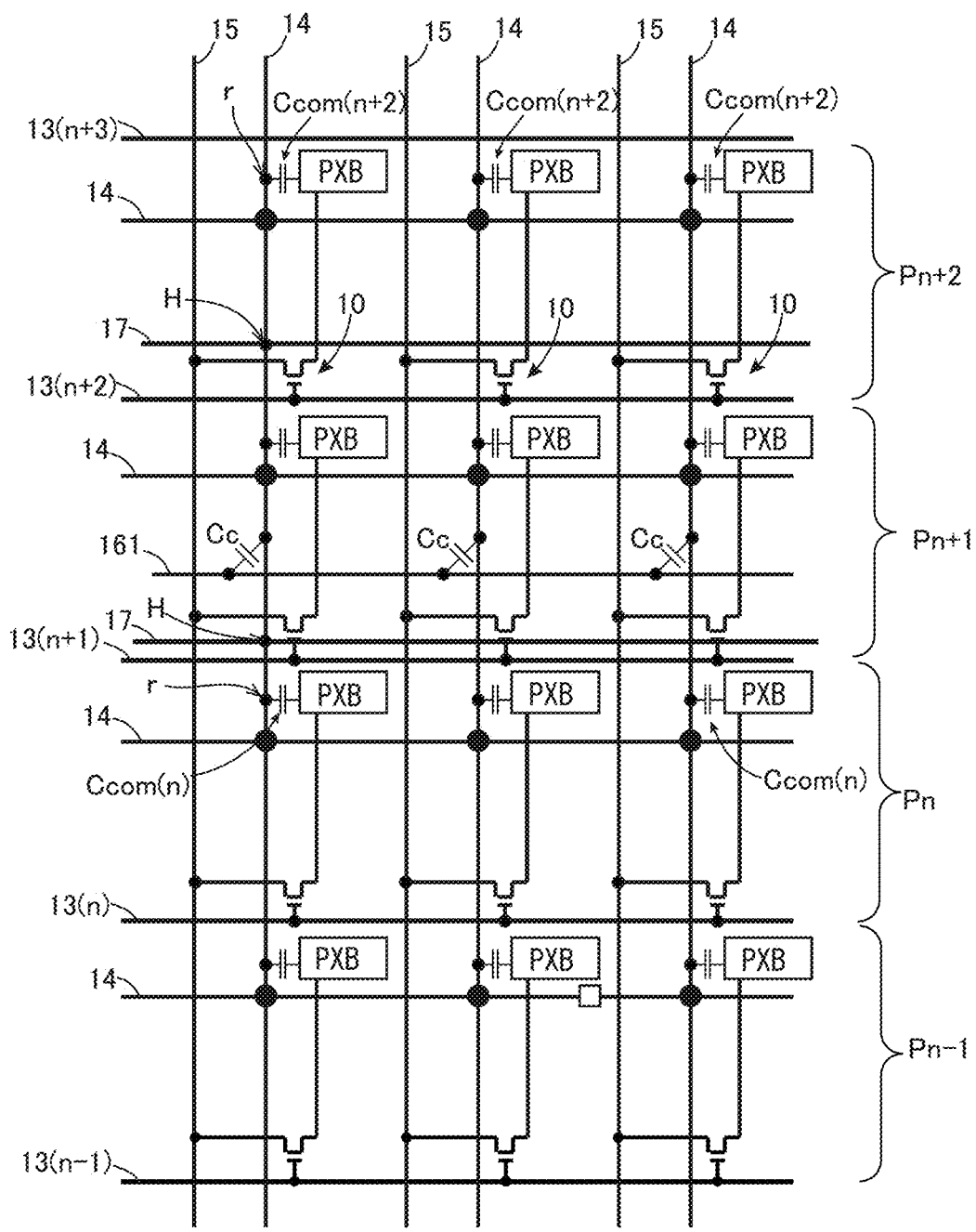
FIG. 8B is a pattern diagram of a case where auxiliary lines are added to the configuration shown in FIG. 8A.

FIGS. 7A and 7B each depict part of the control line 16 surrounded with a broken frame 161 and corresponding to a partial line for supply of the clock signal CK1A or CK1B. When the partial line 161 is decreased in potential, such potential variation influences the common electrode 14 in the pixel provided with the partial line 161. Pixel capacitance between the common electrode 14 and each of the pixel electrodes PXB connected to the gate lines 13(n) and 13(n+2) is varied via the common electrode 14, and the gate lines 13(n) and 13(n+2) come into the unselected state at timing of potential decrease of the partial line 161. Pixel capacitance variation will be specifically described below with reference to FIGS. 8A and 8B. Neither FIG. 8A nor FIG. 8B depicts the resistors 141 for the common electrodes 14.

In a case where the partial line 161 is disposed in the pixels between the gate lines 13(n+1) and 13(n+2) as shown in FIG. 8A, potential decrease of the partial line 161 changes electric charge stored in parasitic capacitance Cc between the partial line 161 and the common electrode 14. The parasitic capacitance CC preliminarily stores electric charge due to potential difference between the partial line 161 and the common electrode 14. In a case where the partial line 161 has potential change and the common electrode 14 has large resistance, the parasitic capacitance Cc receives electric charge stored in the pixel capacitance Ccom near the parasitic capacitance Cc, not from a power supply of the common electrode 14. The common electrode 14 in the pixel near the parasitic capacitance Cc is thus influenced to be decreased in voltage. When timing of potential change of the partial line 161 matches gate off timing of the pixel TFT 10, electric charge from the pixel capacitance Ccom is partially recharged imperfectly to shift pixel potential from set potential. This changes the electric charge stored in the pixel capacitance Ccom to change potential difference between the pixel electrode PXB and the common electrode 14 and cause luminance unevenness.

FIG. 8A exemplarily depicts the pixels adjacent to the partial line 161, in other words, the pixels in rows Pn and Pn+2 adjacent to the row Pn+1 provided with the partial line 161. The common electrode 14 in each of these pixels is likely to be influenced by the parasitic capacitance Cc.

In a case where the gate lines 13(n) and 13(n+2) in the rows Pn and Pn+2 are switched into the unselected state at timing when the potential of the partial line 161 reaches the L level, electric charge stored in pixel capacitance Ccom(n) and pixel capacitance Ccom(n+2) between the common electrodes 14 and the pixel electrodes PXB connected to the gate lines 13(n) and 13(n+2) is decreased due to change in electric charge stored in the parasitic capacitance Cc, and the pixel potential is decreased from original potential to cause luminance unevenness.

As shown in FIG. 8B, the present embodiment thus provides an auxiliary line 17 connected to the common electrode 14 via a contact H and disposed between the partial line 161 and a portion r (hereinafter, referred to as a capacitance forming part) where each of the pixel electrodes PXB connected to the gate line 13(n) and the gate line 13(n+2) forms capacitance between the pixel electrode PXB and the common electrode 14. Provision of the auxiliary line 17 leads to reduction in resistance of the common electrode 14, and electric charge is supplied from the auxiliary line 17 to the parasitic capacitance Cc. This inhibits variation of the pixel capacitance Ccom(n) and the pixel capacitance Ccom (n+2) due to potential decrease of the partial line 161, and is less likely to decrease pixel potential. Provision of the auxiliary line 17 allows electric charge stored in the parasitic capacitance Cc to be likely to be charged from the power supply of the common electrode 14, increases pixels having decrease in electric charge of the pixel capacitance Ccom, and inhibits potential change in each pixel. This inhibits decrease in pixel potential due to potential decrease of the partial line 161 for decrease of luminance unevenness.

Figure 9A:
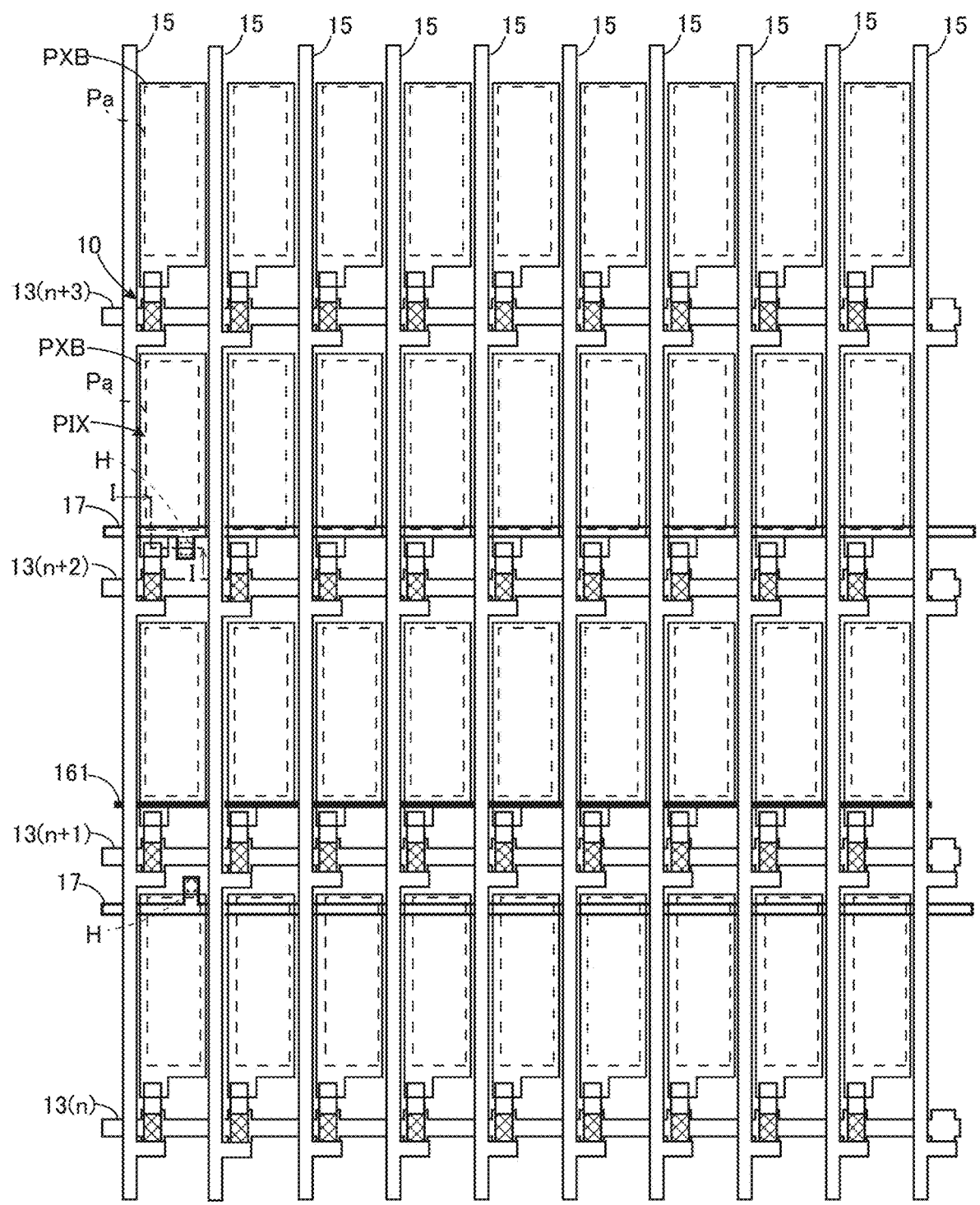
FIG. 9A is an explanatory pattern diagram on positioning of the auxiliary lines.
Figure 9B:
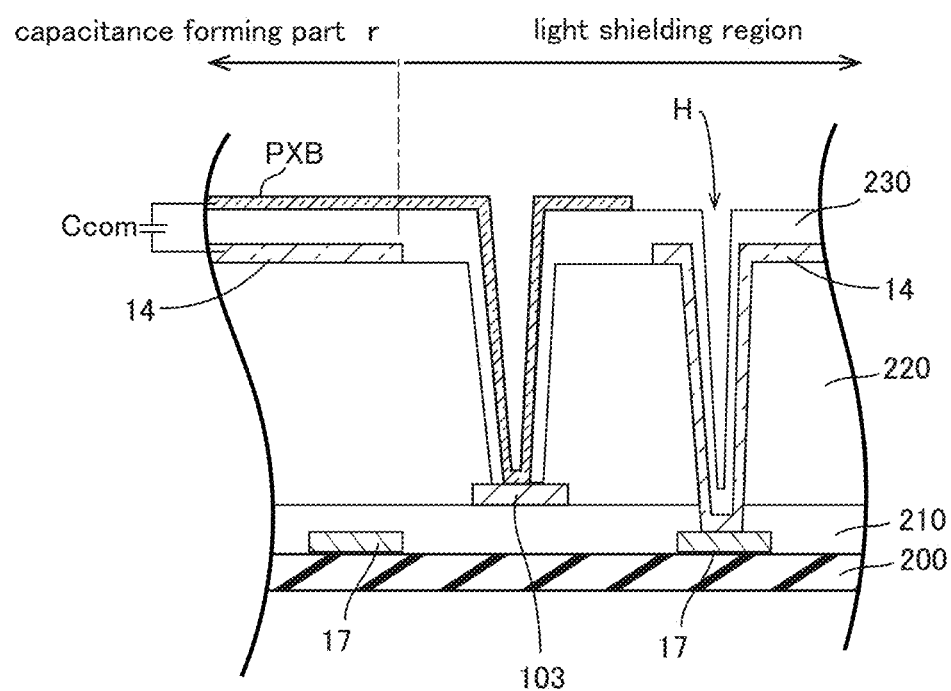
FIG. 9B is a sectional view taken along line I-I indicated in FIG. 9A.

The partial line 161 will be described next in terms of its disposition. FIG. 9A is a pattern plan view of part of the pixels provided with the auxiliary lines 17. FIG. 9B is a sectional view, taken along line I-I, of the pixel provided with the auxiliary line 17 shown in FIG. 9A.

As described above, the pixels PIX shown in FIG. 9A are partially covered with the black matrix provided on the counter substrate 20b. The pixels PIX according to this example each have a light shielding region covered with the black matrix and a transmissive region Pa not covered with the black matrix.

As shown in FIG. 9A, the auxiliary lines 17 are disposed in the transmissive regions Pa of the pixels PIX and are each connected to the common electrode 14 (see FIG. 8B) via the contact H provided in the light shielding region of each of the pixels PIX.

More specifically, a substrate 200 is provided thereon with the auxiliary line 17 as shown in FIG. 9B. The auxiliary line 17 are disposed at a layer level of a gate electrode (not shown) of the pixel TFT 10, and is provided thereon with a gate insulating film 210. The gate insulating film 210 is provided thereon with a drain electrode 103 and a buffer layer 220 of the pixel TFT 10. The buffer layer 220 and the gate insulating film 210 in the light shielding region are provided with the contact H positioned to be overlapped with the auxiliary line 17. The buffer layer 220 is provided thereon with the common electrode 14 in each of the capacitance forming part r and the light shielding region. The common electrode 14 in the light shielding region is connected to the auxiliary line 17 via the contact H. The auxiliary line 17 according to this example is made of a metal film lower in resistance than the common electrode 14. The common electrode 14 is provided thereon with an insulating film 230. In the capacitance forming part r, the insulating film 230 is provided thereon with the pixel electrode PXB and the pixel capacitance Ccom is formed between the pixel electrode PXB and the common electrode 14.

The auxiliary line 17 according to this example is disposed at the layer level of the gate electrode (not shown), and is connected to the common electrode 14 via the gate insulating film 210 and the buffer layer 220 in the light shielding region. The auxiliary line 17 according to this example is disposed at the layer level of the gate electrode (not shown), but may alternatively be disposed at a layer level of the drain electrode 103.

Application Example 1

The first embodiment exemplifies the case of providing only the auxiliary lines 17 in parallel with the gate lines. There may be further provided an auxiliary line substantially in parallel with the source lines.

Figure 10:
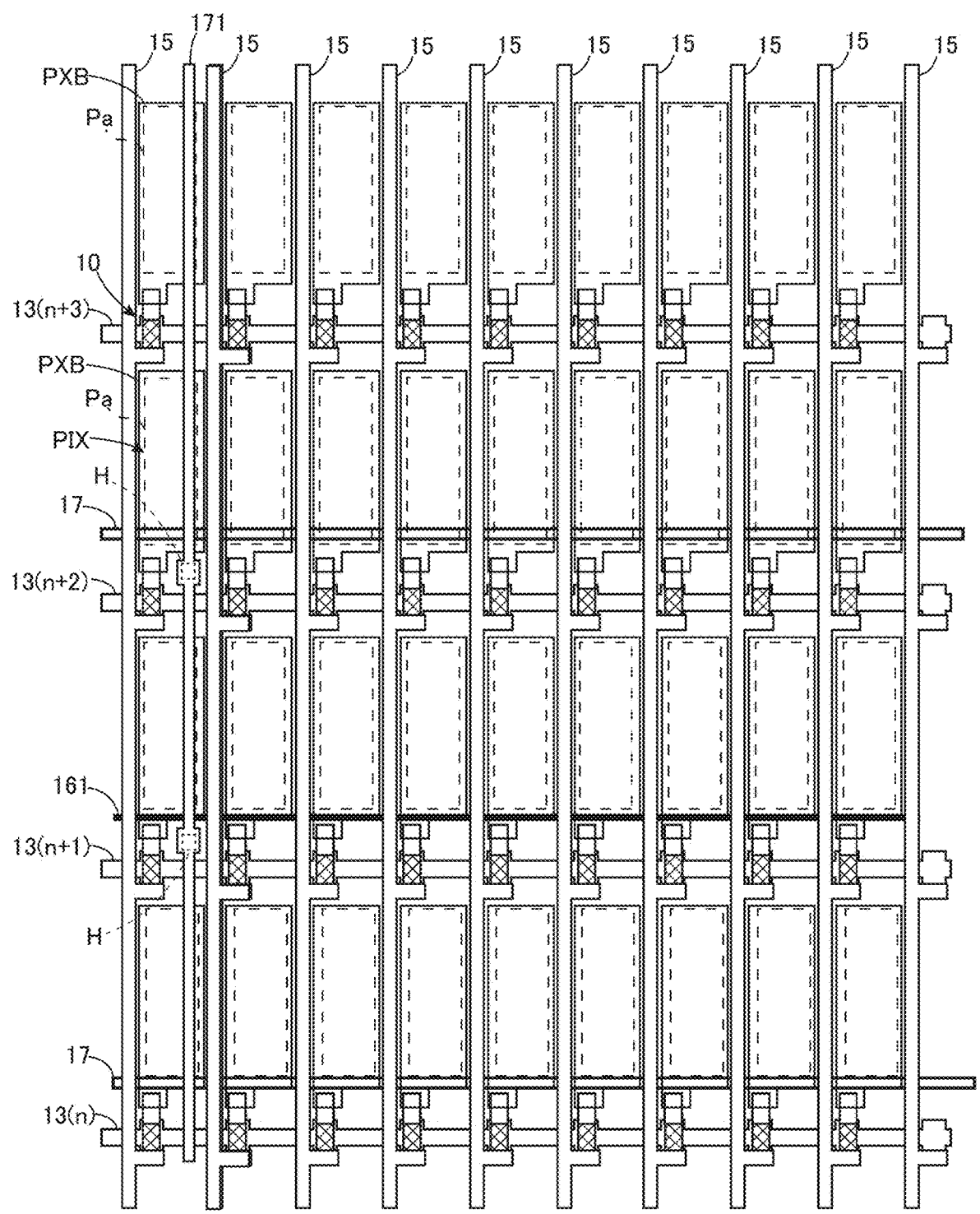
FIG. 10 is a pattern diagram showing exemplary disposition of auxiliary lines according to an application example 1 of the first embodiment.

FIG. 10 is a pattern diagram showing exemplary disposition of auxiliary lines according to the application example 1. As shown in FIG. 10, the present application example provides an auxiliary line 171 crossing the auxiliary lines 17. The auxiliary line 171 is provided in the transmissive regions Pa of the pixels and are substantially in parallel with the source lines 15. The auxiliary line 171 is connected to the common electrode 14 via the contact H provided in the light shielding region. Provision of the auxiliary line 171 enables further reduction in resistance of the common electrode 14 in comparison to the case where only the auxiliary lines 17 are provided.

Application Example 2

Figure 11:
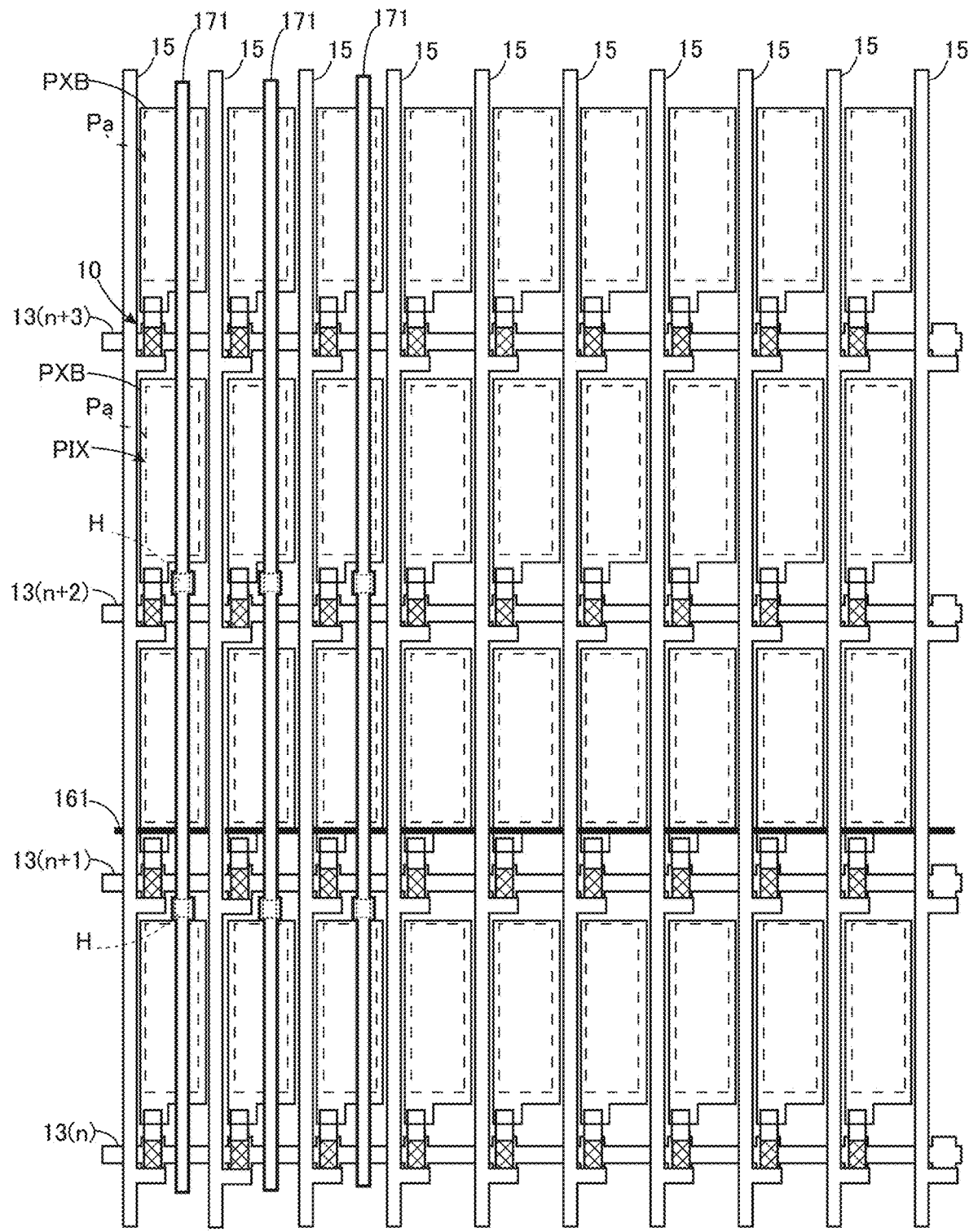
FIG. 11 is a pattern diagram showing exemplary disposition of auxiliary lines according to an application example 2 of the first embodiment.

As exemplarily shown in FIG. 11, the auxiliary lines 17 may not be provided and only the auxiliary line 171 may be provided. In this case, a plurality of auxiliary lines 171 is disposed in a plurality of columns and crosses the partial line 161. Each of the auxiliary lines 171 is connected to the common electrode 14 via the contact H in the light shielding region of each of the pixels including the pixel electrodes PXB connected to the gate line 13(*n*+2) and the gate line 13(*n*) influenced by potential variation of the partial line 161. Such a configuration also enables reduction in resistance of the common electrode 14. The pixels including the pixel electrodes PXB connected to the gate line 13(*n*+2) and the gate line 13(*n*) each have pixel capacitance less likely to be influenced by potential variation of the partial line 161, to inhibit decrease in pixel potential.

Application Example 3

Figure 12:
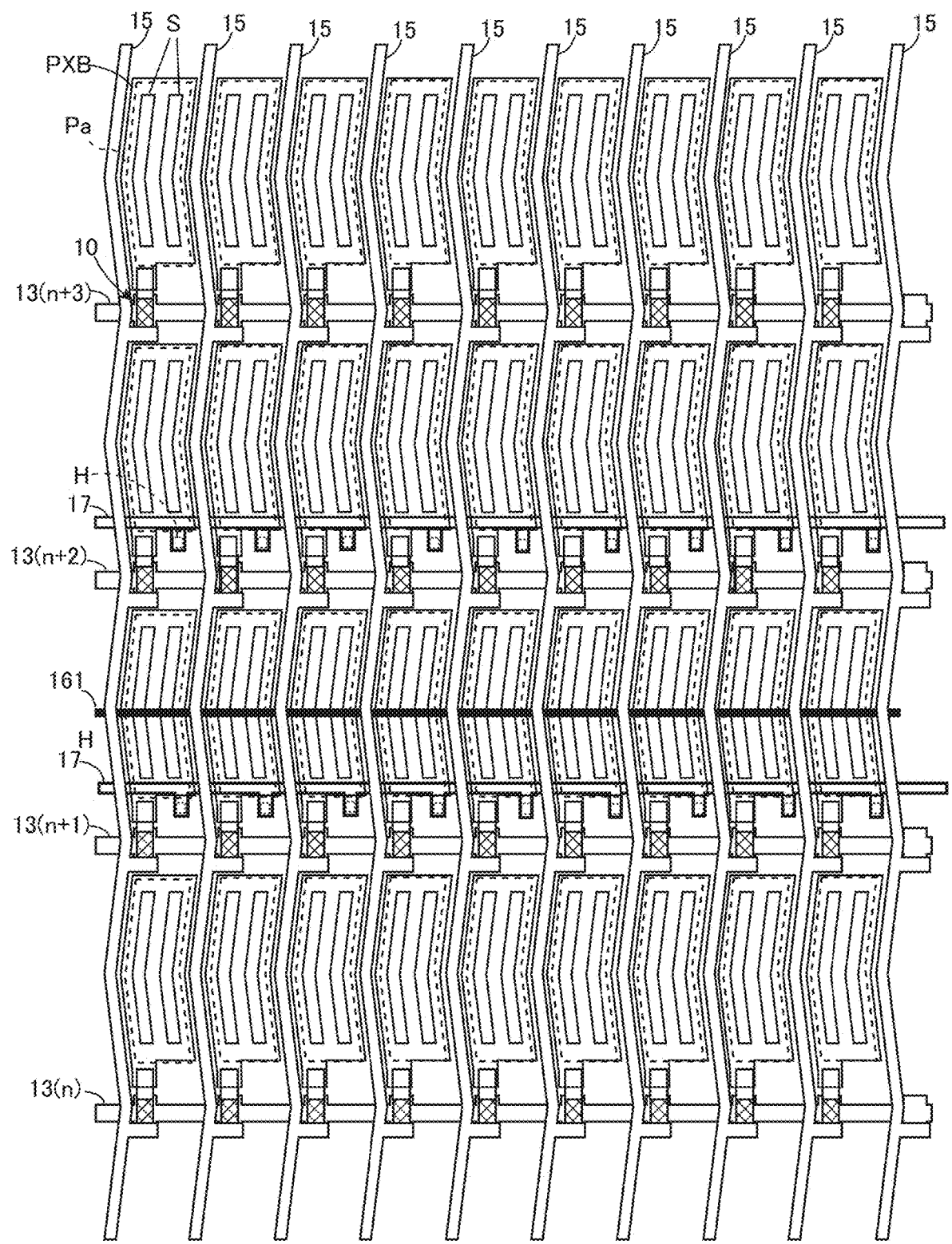
FIG. 12 is a pattern diagram showing exemplary disposition of auxiliary lines according to an application example 3 of the first embodiment.

The first embodiment exemplifies the single domain having identical liquid crystal orientation in each of the pixels. Each of the pixels may alternatively have multiple domains including a plurality of regions different in liquid crystal orientation. FIG. 12 is a pattern diagram exemplifying pixels having two domains different from each other in liquid crystal orientation.

The source lines 15 and the pixel electrodes PXB according to this example are each bent in two directions substantially at the center in a longer side. Each of the pixel electrodes PXB has slits S. There is generated a transverse electric field between the pixel electrode PXB and the common electrode 14 (see FIG. 9B), and the liquid crystal molecules in each of the pixels are controlled to be oriented in the two directions. The domains in the pixel according to this example has a boundary substantially in parallel with the gate line 13 substantially at the center of the pixel. The orientation changes at the boundary between the domains to cause collision of the liquid crystal molecules, which are accordingly oriented along a polarizing axis of the linear polarizing plates to decrease light transmissivity and generate a dark line.

As shown in FIG. 12, the partial line 161 according to this example is disposed at the boundary between the domains, in other words, in a region substantially in parallel with the gate line 13 substantially at the center of each of the pixels. The auxiliary lines 17 are disposed to interpose the partial line 161 in a planar view in the transmissive regions Pa of the pixels including the pixel electrodes PXB connected to the gate line 13(*n*+2) and the gate line 13(*n*) that come into the unselected state at timing of potential decrease of the partial line 161. Each of the auxiliary lines 17 is connected to the common electrode 14 via the contact H provided in the light shielding region of each of the pixels provided with the auxiliary line 17.

This example thus provides the partial line 161 and the auxiliary line 17 disposed in an identical pixel. Disposition of the partial line 161 and the auxiliary line 17 in an opening of the identical pixel having the single domain leads to decrease in aperture ratio. The partial line 161 according to this example is disposed in a region having the dark line, to inhibit decrease in transmissivity of the identical pixel provided with the partial line 161 and the auxiliary line 17.

Second Embodiment

The first embodiment exemplifies disposition of the auxiliary line 17 in the transmissive region Pa of the pixel. The present embodiment will exemplify a case where the auxiliary line 17 is disposed in the light shielding region.

Figure 13A:
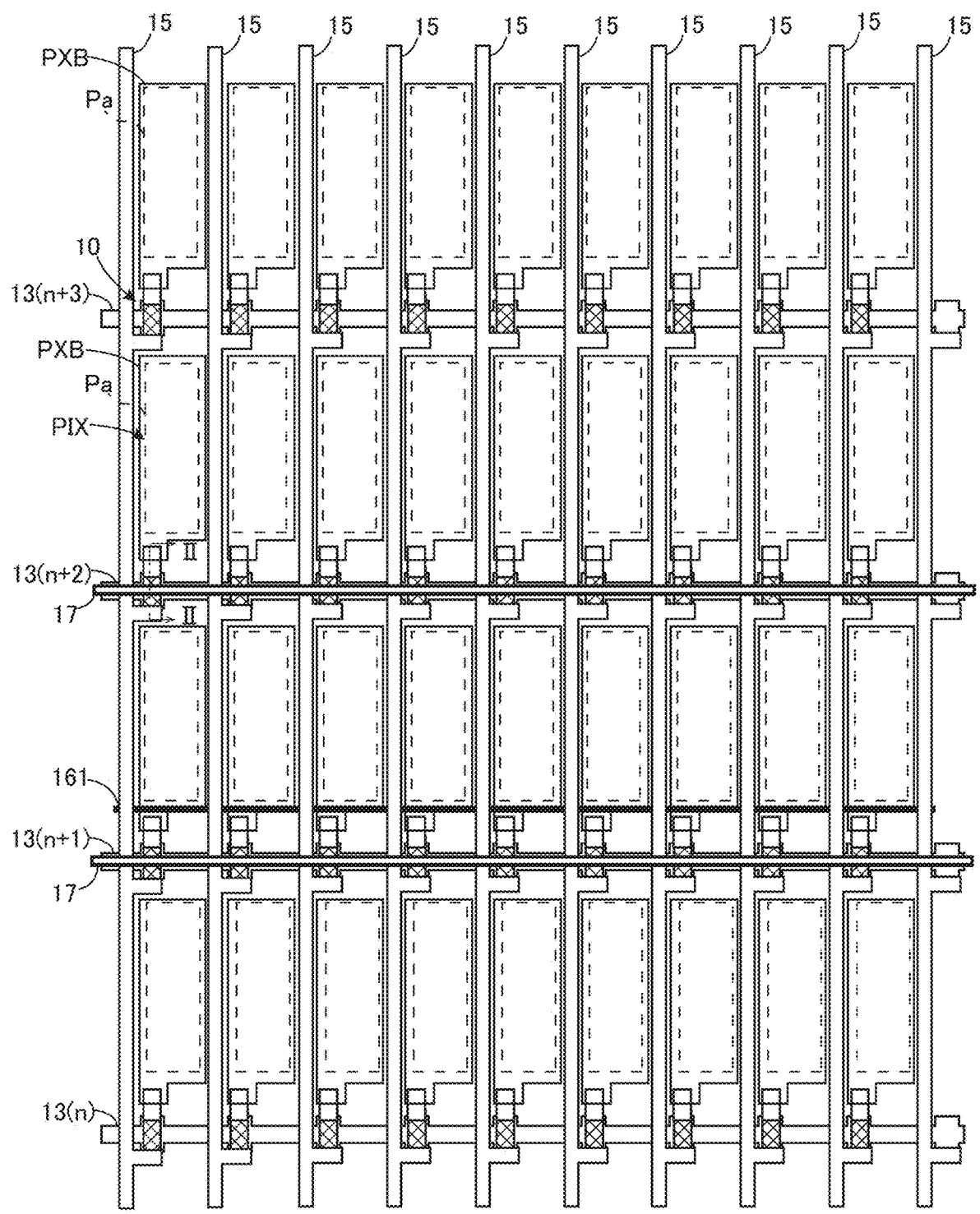
FIG. 13A is a pattern diagram showing exemplary disposition of auxiliary lines according to a second embodiment.

FIG. 13A is a pattern plan view showing exemplary disposition of the auxiliary lines according to the present embodiment. In FIG. 13A, components similar to those according to the first embodiment are denoted by reference signs similar to those in the first embodiment.

As shown in FIG. 13A, the auxiliary lines 17 according to the present embodiment are disposed to be overlapped with the gate line 13(*n*+2) and the gate line 13(*n*+1) such that the partial line 161 is interposed between the auxiliary lines 17 in a planar view.

Figure 13B:
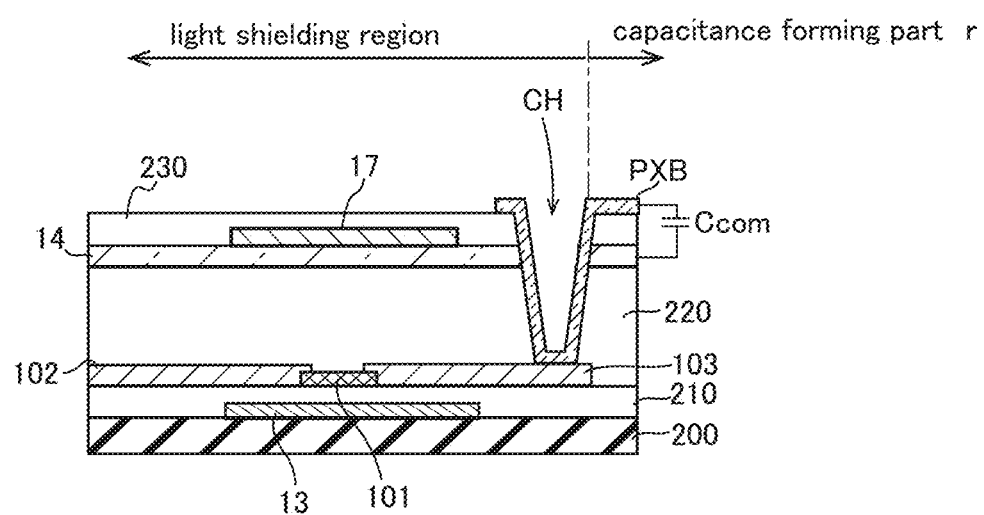
FIG. 13B is a sectional view taken along line II-II indicated in FIG. 13A.

FIG. 13B is a sectional view taken along line II-II indicated in FIG. 13A. As shown in FIG. 13B, the substrate 200 is provided thereon with the gate line 13 that is covered with the gate insulating film 210. The gate line 13 is provided integrally with the gate electrode of the pixel TFT 10. The gate insulating film 210 is provided thereon with a semiconductor layer 101 of the pixel TFT 10, and the semiconductor layer 101 is provided thereon with a source electrode 102 and the drain electrode 103 of the pixel TFT 10.

The source electrode 102 and the drain electrode 103 are provided thereon with the buffer layer 220, and the common electrode 14 is provided on the buffer layer 220. The common electrode 14 is provided thereon with the auxiliary line 17 in contact with the common electrode 14. The common electrode 14 is made of metal lower in resistance than the common electrode 14, as in the first embodiment.

The auxiliary line 17 and the common electrode 14 are covered with the insulating film 230, the pixel electrode PXB is provided on the insulating film 230. A contact hole CH penetrating the buffer layer 220, the common electrode 14, and the insulating film 230 is provided on the drain electrode 103. The pixel electrode PXB is connected to the drain electrode 103 via the contact hole CH.

The auxiliary line 17 is disposed between the partial line 161 and the transmissive regions Pa of the pixels, in other words, the capacitance forming parts r of the pixels including the pixel electrodes PXB connected to each of the gate line 13($n$+2) and the gate line 13($n$) that come into the unselected state at timing of potential decrease of the partial line 161. The common electrodes 14 are connected to the auxiliary lines 17 on the gate line 13($n$+2) and the gate line 13($n$+1) to achieve reduction in resistance. This configuration is less likely to propagate noise generated by potential variation of the partial line 161 to the pixel electrodes PXB connected to the gate line 13($n$+2) and the gate line 13($n$) via the common electrodes 14, to be less likely to have decrease in pixel potential. The auxiliary lines 17 are disposed not in the transmissive regions Pa but on the gate lines 13 in the light shielding regions (unopened portions), to inhibit decrease in aperture ratio in comparison to the configuration according to the first embodiment.

The auxiliary lines 17 according to this example are disposed to be overlapped with the gate lines 13. The auxiliary lines 17 may not be necessarily overlapped with the gate lines 13 if the auxiliary lines 17 are disposed in the light shielding regions (unopened portions) provided between the partial line 161 and the capacitance forming parts r of the pixels including the pixel electrodes PXB connected to the gate line 13($n$+2) and the gate line 13($n$).

The embodiments of the present invention described above are merely exemplified for implementation of the present invention. The present invention should not be limited to the above embodiments, but can be achieved with appropriate modification to or combination of the above embodiments without departing from the spirit of the present invention. Modification examples of the present invention will be described below.

Modification Examples (1) The gate drivers 11 according to any one of the above practical examples are each driven in accordance with the clock signals in the four phases. The present invention does not limitedly adopt such clock signals. For example, each of the gate drivers 11 may be driven in accordance with clock signals in eight phases. The gate drivers and the auxiliary line will be described below in terms of exemplary disposition thereof in this case.

FIG. 14 is a pattern diagram showing exemplary disposition of the gate drivers 11 configured to be driven in accordance with the clock signals in the eight phases. As shown in FIG. 14, each of the gate drivers 11 is disposed in the pixels between the second gate line 13($n$+2) and the third gate line 13($n$+3) from the gate line 13($n$) that is driven by the corresponding gate driver 11. Each of the gate drivers 11 is connected, via the control line 16, to the gate driver 11 configured to drive the ninth gate line 13 from a corresponding gate line 13 driven by the gate driver 11. Specifically, the gate driver 11(1) configured to drive the gate line 13(1) is connected to the gate driver 11(9) configured to drive the gate line 13(9). The gate driver 11(2) configured to drive the gate line 13(2) is connected to the gate driver 11(10) configured to drive the gate line 13(10).

Figure 15:
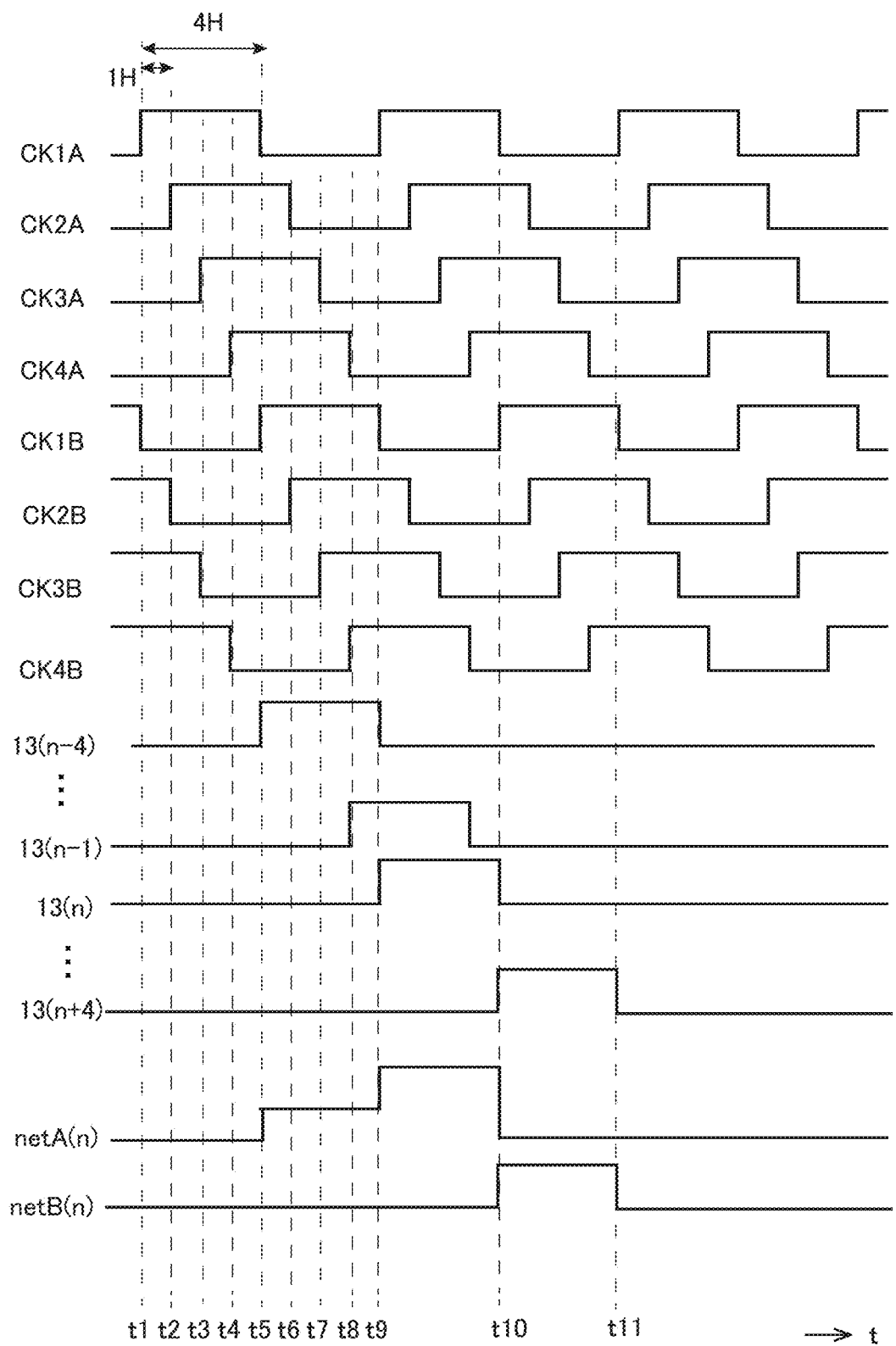
FIG. 15 is a timing chart indicating potential change of clock signals, gate lines, and internal lines according to the modification example 1.

FIG. 15 is a timing chart indicating potential change of the clock signals in the eight phases, the gate lines 13($n$−4) to 13($n$+4), and the internal lines netA($n$) and netB($n$) according to the present modification example.

As shown in FIG. 15, the clock signals in the eight phases, namely, clock signals CK1A to CK4A and CK1B to CK4B have phases shifted by ¼ cycles each and each have potential alternately reaching the H level and the L level in every four horizontal scanning periods (4H). Although not shown in FIG. 15, the reset signal CLR reaches the H level for a constant period in every vertical scanning period, and is outputted from the display control circuit 4 in each frame as in the first embodiment.

The clock signals CKA and CKB supplied to the TFT-F and the TFT-H, and the TFT-D and the TFT-G, respectively, in the gate driver 11 (see FIG. 5) correspond to two clock signals having phases opposite to each other in the eight clock signals. There are eight combinations of the clock signals CKA and CKB, namely, (CK1A, CK1B), (CK2A, CK2B), (CK3A, CK3B), (CK4A, CK4B), (CK1B, CK1A), (CK2B, CK2A), (CK3B, CK3A), and (CK4B, CK4A).

Each of the gate drivers 11 is supplied with the clock signals having phases shifted by ¼ cycles from the clock signals supplied to the gate driver 11 configured to drive the gate line 13 in the preceding row. In a case where the gate driver 11($n$) is supplied with the combination (CK1A, CK1B) as the clock signals CKA and CKB, the gate driver 11($n$+1) is supplied with the combination (CK2A, CK2B) as the clock signals CKA and CKB and the gate driver 11($n$−1) is supplied with the combination (CK2B, CK2A) as the clock signals CKA and CKB.

As shown in FIG. 15, the gate line 13($n$) comes into the unselected state at timing (t9) when the potential of the clock signal CK1A changes to the L level in this case. The gate line 13($n$+4) comes into the unselected state at timing (t11) when the potential of the clock signal CK1B changes to the H level.

Though not shown, the elements constituting the gate driver 11($n$) are disposed in the pixels between the second gate line 13($n$+2) and the third gate line 13($n$+3) from the gate line 13($n$) that is driven by the gate driver 11($n$). Accordingly, the partial line 161 of the control line 16 for supply of the clock signals CK1A and CK1B to the gate driver 11($n$) is also disposed between the gate line 13($n$+2) and the gate line 13($n$+3).

Figure 16:
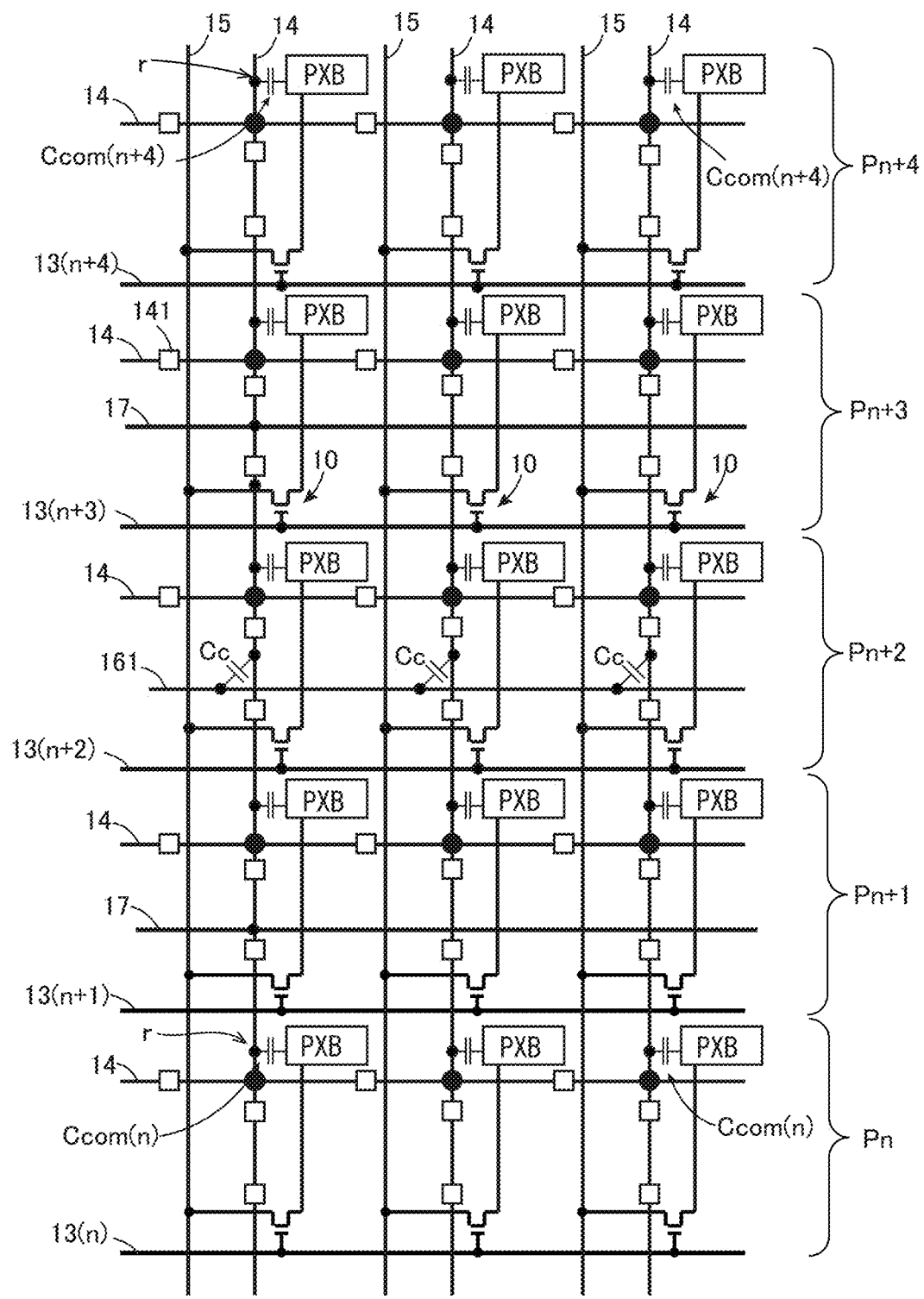
FIG. 16 is a pattern diagram showing exemplary disposition of auxiliary lines according to the modification example 1.

As shown in FIG. 16, the partial line 161 is disposed between the gate line 13($n$+2) and the gate line 13($n$+3). The parasitic capacitance Cc is generated between the partial line 161 and the common electrode 14 in each of the pixels including the pixel electrodes PXB connected to the gate line 13($n$+2).

In this case, the auxiliary lines 17 are connected to the common electrodes 14 in the light shielding regions of the pixels disposed between the gate line 13($n$+3) and the gate line 13($n$+4) and in the light shielding regions of the pixels disposed between the gate line 13($n$+2) and the gate line 13($n$+1). Each of the auxiliary lines 17 is interposed between, in a planar view, the partial line 161 and the capacitance forming parts r of the pixels including the pixel electrodes PXB connected to the gate line 13($n$) or the gate line 13($n$+4) that comes into the unselected state at timing of potential decrease of the partial line 161.

Such a configuration achieves reduction in resistance of the common electrodes 14, and is less likely to propagate noise generated by potential decrease of the partial line 161 to the pixel electrodes PXB connected to the gate line 13($n$+4) and the gate line 13($n$) via the common electrodes 14. Potential variation of the partial line 161 is thus less likely to influence the pixel capacitance Ccom($n$+4) and the pixel capacitance Ccom(n) between the common electrodes 14 and the pixel electrodes PXB connected to the gate line 13(n+4) and the gate line 13(n), for inhibition of decrease in pixel potential.

The partial line 161 according to the present modification example is disposed in the pixels in the second row from the pixels including the pixel electrodes connected to the gate line 13 that comes into the unselected state at timing of potential decrease of the partial line 161. As the partial line 161 is distant from the pixel electrodes connected to the gate line 13 influenced by potential decrease of the partial line 161, noise generated by potential decrease of the partial line 161 is less likely to influence pixel capacitance of the pixel electrodes. In comparison to a case where the partial line 161 is provided in the pixels including the pixel electrodes connected to the gate line 13 influenced by potential decrease of the partial line 161 or the pixels in an adjacent row, the pixel electrodes in these pixels are less likely to be influenced by potential decrease of the partial line 161 to further inhibit luminance unevenness.

(2) Each of the embodiments and the modification example described above provides the partial line 161 disposed in the pixels in a row different from a row of the pixels provided with the gate line 13 that is influenced by potential variation of the partial line 161. The present invention is not limited to this case in terms of disposition of the partial line 161. The partial line 161 will be described below in terms of different exemplary disposition.

Figure 17A:
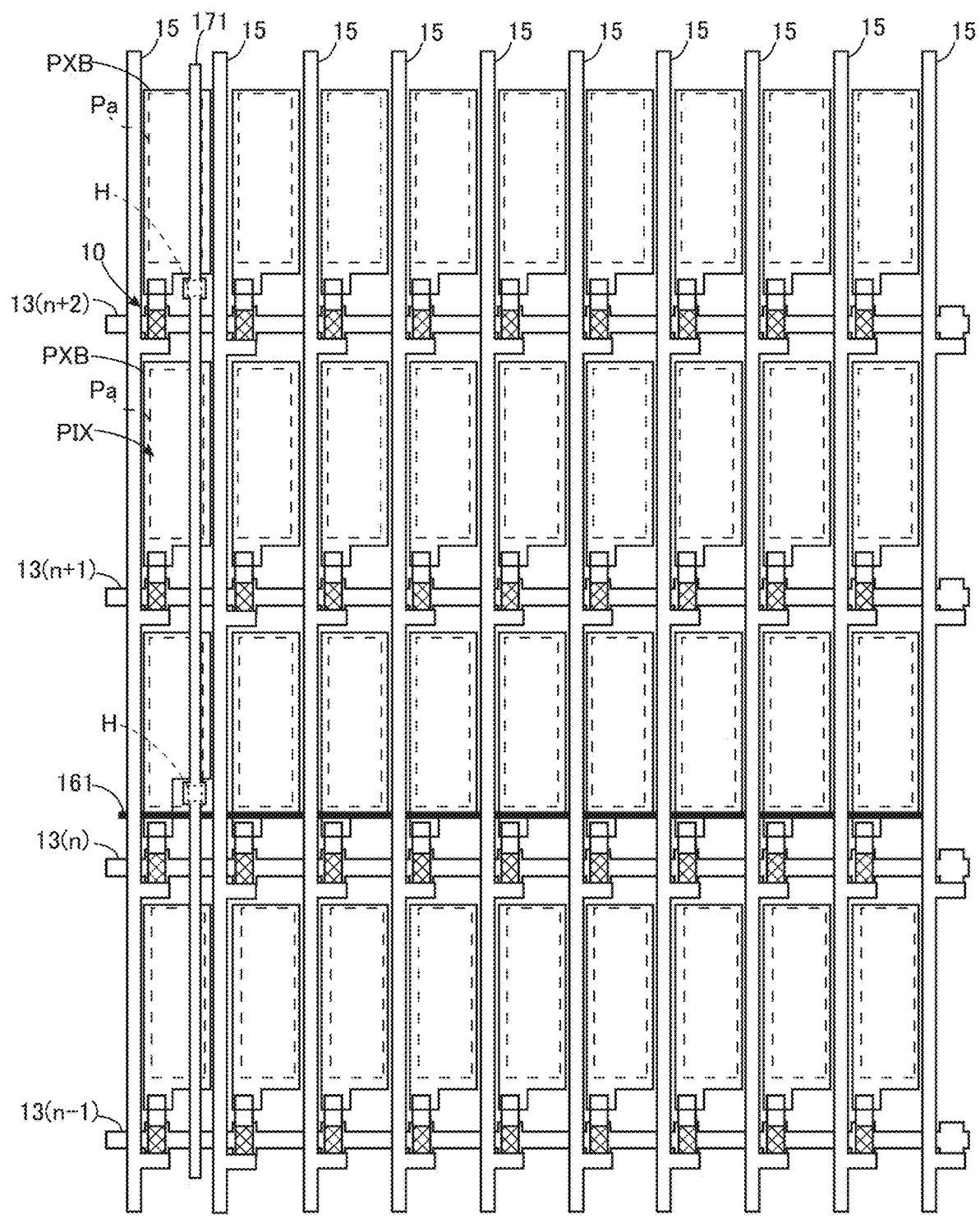
FIG. 17A is a pattern diagram showing exemplary disposition of an auxiliary line according to a modification example 2(A).

(A) FIG. 17A is a pattern diagram showing exemplary disposition of the partial line 161 and an auxiliary line according to the present modification example. FIG. 17A exemplifies the case similar to the first embodiment where the gate lines 13(n) and 13(n+2) are switched into the unselected state at timing when the potential of the partial line 161 reaches the L level. As shown in FIG. 17A, the partial line 161 is disposed to be overlapped in a planar view with part of the pixel electrode PXB in the light shielding region of each of the pixels between the gate line 13(n) and the gate line 13(n+1). The partial line 161 according to this example is disposed in the row of the pixels provided with the gate line 13 influenced by potential variation of the partial line 161.

In this case, the auxiliary line 171 substantially in parallel with the source lines 15 is disposed to cross the partial line 161 to prevent the pixel electrodes PXB connected to the gate line 13(n) from being influenced by potential variation of the partial line 161. The auxiliary line 171 according to this example is disposed below the buffer layer 220 (see FIG. 9B).

The contact H connecting the auxiliary line 171 and the common electrode 14 (see FIG. 9B and the like) is provided between the partial line 161 and the capacitance forming part r in the pixel PIX provided with the partial line 161. More specifically, the pixel electrode PXB in the pixel provided with the contact H connecting the auxiliary line 171 and the common electrode 14 is smaller than the remaining pixel electrodes PXB in the pixels provided with the partial line 161 exemplified in FIG. 17A. The contact H in this pixel is positioned in the transmissive region Pa so as not to be overlapped with the pixel electrode PXB. In this case, the partial line 161 is overlapped with part of the pixel electrode PXB influenced by potential change of the partial line 161. Accordingly, the pixel electrode PXB cannot be perfectly prevented from being influenced by potential change of the partial line 161. However, in comparison to a case of providing no auxiliary line 171, the pixel electrode PXB can be less influenced by potential change of the partial line 161.

Figure 17B:
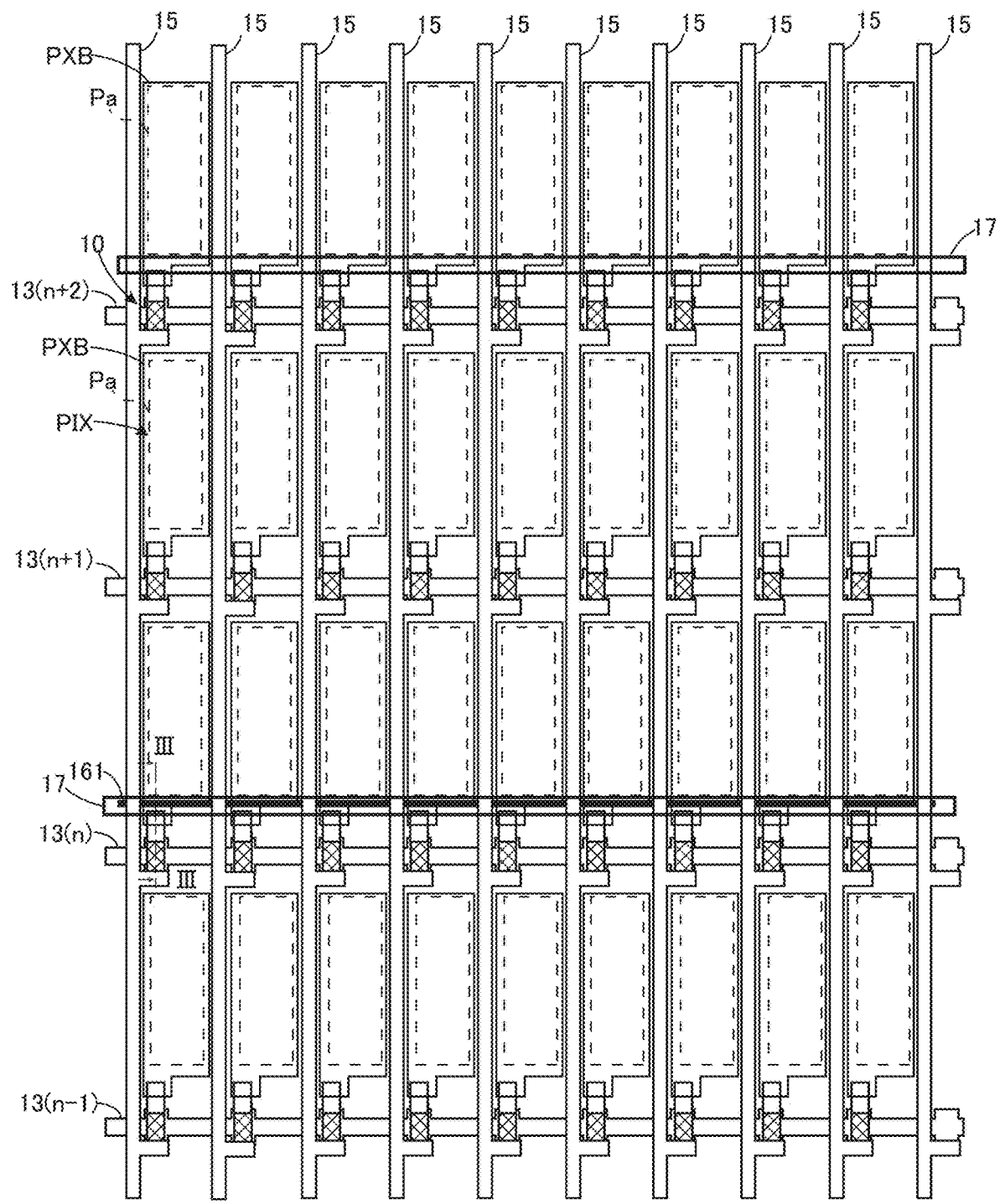
FIG. 17B is a pattern diagram showing exemplary disposition of an auxiliary line according to a modification example 2(B).
Figure 17C:
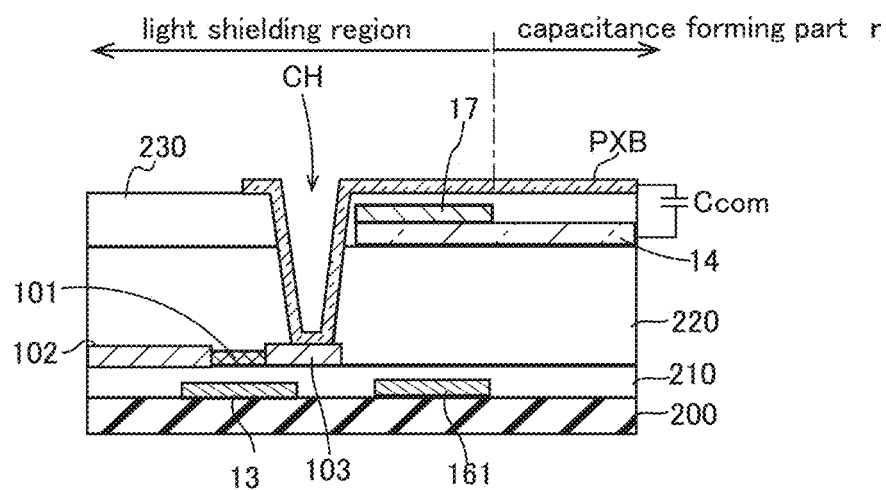
FIG. 17C is a sectional view taken along line indicated in FIG. 17B.

(B) FIG. 17B is a pattern diagram showing exemplary disposition different from the case (A), of the auxiliary line. The partial line 161 shown in this figure is disposed identically with that in the case (A). FIG. 17C is a sectional view taken along line III-III indicated in FIG. 17B. As shown in FIGS. 17B and 17C, the auxiliary line 17 is disposed on the buffer layer 220 so as to be overlapped with the partial line 16, and is in contact with the common electrode 14. Also in this case, the partial line 161 is overlapped with part of the pixel electrode PXB influenced by potential change of the partial line 161. Accordingly, the pixel electrode PXB cannot be perfectly prevented from being influenced by potential change of the partial line 161. However, in comparison to the case of providing no auxiliary line 171, the pixel electrode PXB can be less influenced by noise generated by potential change of the partial line 161. The pixel electrodes PXB have substantially identical in shape in this case, and are likely to be produced through a less complicated process in comparison to the case (A).

The invention claimed is:

1. An active matrix substrate comprising a plurality of gate lines, a plurality of source lines, a plurality of pixel electrodes respectively provided in a plurality of pixels defined by the plurality of gate lines and the plurality of source lines, and a common electrode disposed to face each of the pixel electrodes, the active matrix substrate further comprising:
a plurality of drive circuits respectively provided for the plurality of gate lines, each configured to switch a corresponding one of the gate lines into a selected state or an unselected state in accordance with a received drive signal, and disposed in part of a display region including the plurality of pixels;
a control line for supply of the drive signal to each of the drive circuits; and
an auxiliary line provided in the display region and connected to the common electrode; wherein
the drive signal has potential switched between first potential and second potential lower than the first potential at constant cycles,
the control line includes a line portion substantially in parallel with the gate lines,
part of the gate lines are switched into the unselected state while the line portion is changed in potential to the second potential, and
between the line portion and a capacitance forming region where each of the pixel electrodes connected to the part of the gate lines forms capacitance between the pixel electrode and the common electrode, the auxiliary line is connected with the common electrode.

2. The active matrix substrate according to claim 1, further comprising:
an insulating film interposed between the auxiliary line and the common electrode; wherein
the insulating film has a contact hole between the capacitance forming region and the line portion, at a position where the auxiliary line and the common electrode are overlapped with each other, and
the auxiliary line is connected with the common electrode via the contact hole.

3. The active matrix substrate according to claim 1, wherein, between the capacitance forming region and the line portion, the auxiliary line is in contact with the common electrode.

4. The active matrix substrate according to claim 1, wherein
the plurality of pixel is arrayed to form a matrix, and
the line portion is provided in a row other than a row of the pixels including the pixel electrodes connected to the gate line that is switched into the unselected state while the line portion changes in potential from the first potential to the second potential.

5. A display device comprising:
the active matrix substrate according to claim 1;
a counter substrate having a color filter; and
a liquid crystal layer interposed between the active matrix substrate and the counter substrate.

6. The display device according to claim 5, wherein
the pixels each have two domain regions different from each other in orientation of liquid crystal molecules, and
the line portion is disposed at a boundary between the two domain regions in the pixel provided with the line portion.

* * * * *